US007634513B2

(12) United States Patent
Harvey

(10) Patent No.: US 7,634,513 B2
(45) Date of Patent: Dec. 15, 2009

(54) METADATA IN DIRECTORY SERVICE SYSTEMS AND METHODS

(75) Inventor: Richard Hans Harvey, Ringwood (AU)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 10/174,824

(22) Filed: Jun. 20, 2002

(65) Prior Publication Data
US 2003/0105749 A1 Jun. 5, 2003

Related U.S. Application Data

(60) Continuation of application No. 09/427,265, filed on Oct. 26, 1999, now abandoned, which is a division of application No. 08/793,575, filed on May 22, 1997, now Pat. No. 6,052,681.

(30) Foreign Application Priority Data

Sep. 1, 1994   (AU) .................................... PM7842
Nov. 21, 1994  (AU) .................................... PM9586

(51) Int. Cl.
  *G06F 12/00*  (2006.01)
  *G06F 17/30*  (2006.01)
(52) U.S. Cl. ........................ 707/203; 715/229
(58) Field of Classification Search ............... 707/1–10, 707/100–104.1, 200–206; 715/229; 717/120–123, 717/168–173, 174–178
See application file for complete search history.

(56) References Cited

U.S. PATENT DOCUMENTS 4,914,571 A    4/1990 Baratz et al.

(Continued)

FOREIGN PATENT DOCUMENTS

EP       0 689 148 A1    5/1995

(Continued)

OTHER PUBLICATIONS

C.M.R. Leung, An Object Oriented Approach to Directory Systems, Sep. 1990, IEEE, 736-740.*

(Continued)

*Primary Examiner*—Jean B Fleurantin
(74) *Attorney, Agent, or Firm*—Baker Botts L.L.P.

(57) ABSTRACT

A method and apparatus for implementing directory services, such as X.500 and LDAP in a SQL environment, and for providing a desired level of indexing, extensibility and scalability. In the directory service system, a plurality of objects are defined to be hierarchical, and the relationships among objects follow a tree structure where each object has a parent object and except for a root, each parent can have zero or more children. The database comprises at least one table having a plurality of rows and columns and stores a plurality of data items, each having a value, each being related to one of a plurality of data types and each having attributes defined by the directory. The attributes of the directory are arranged in a row-per-data type and value format, resulting in a representation identified as meta-data, wherein values are represented per row by data type: identifying one of said plurality of data types,
  syntax: identifying the nature of the data type, and
  value: identifying the data value.

In the application of metadata to directory services, such as X.500 or LDAP, a 'PROPERTY table' is provided in which object name and parent name is added to the 'principal design'. Other arrangements of tables and attributes provide for the achievement of the system goals.

22 Claims, 6 Drawing Sheets

U.S. PATENT DOCUMENTS

| | | | |
|---|---|---|---|
| 5,117,349 A | 5/1992 | Tirfing et al. ............... | 395/600 |
| 5,218,699 A | 6/1993 | Brandle et al. | |
| 5,291,583 A | 3/1994 | Bapat ......................... | 717/137 |
| 5,317,742 A | 5/1994 | Bapat | |
| 5,333,317 A | 7/1994 | Dann ........................... | 707/5 |
| 5,388,255 A * | 2/1995 | Pytlik et al. ..................... | 707/4 |
| 5,412,804 A | 5/1995 | Krishna ........................ | 707/2 |
| 5,414,812 A * | 5/1995 | Filip et al. .............. | 707/103 R |
| 5,491,817 A | 2/1996 | Gopal et al. ............... | 395/600 |
| 5,530,853 A | 6/1996 | Schell et al. ................ | 395/600 |
| 5,548,726 A | 8/1996 | Pettus ......................... | 709/221 |
| 5,634,053 A | 5/1997 | Noble et al. ................... | 707/4 |
| 5,649,182 A | 7/1997 | Reitz ............................. | 707/7 |
| 5,664,172 A | 9/1997 | Antoshenkov ............. | 395/604 |
| 5,692,181 A | 11/1997 | Anand et al. | |
| 5,794,232 A | 8/1998 | Mahlum et al. | |
| 5,806,061 A | 9/1998 | Chaudhuri et al. ............. | 707/3 |
| 5,864,840 A | 1/1999 | Leung et al. .................... | 707/2 |
| 5,878,415 A | 3/1999 | Olds ............................. | 707/9 |
| 5,953,716 A | 9/1999 | Madnick et al. ................ | 707/4 |
| 5,970,497 A | 10/1999 | Burrows ..................... | 707/102 |
| 5,987,446 A | 11/1999 | Corey et al. ..................... | 707/3 |
| 6,003,022 A | 12/1999 | Eberhard et al. .............. | 707/2 |
| 6,003,050 A | 12/1999 | Silver et al. ................. | 715/536 |
| 6,009,422 A | 12/1999 | Ciccarelli ...................... | 707/4 |
| 6,016,497 A | 1/2000 | Suver ..................... | 707/103 R |
| 6,016,499 A | 1/2000 | Ferguson ................ | 707/104.1 |
| 6,044,442 A | 3/2000 | Jesionowski ............... | 711/153 |
| 6,052,681 A | 4/2000 | Harvey | |
| 6,085,188 A | 7/2000 | Bachmann et al. ............. | 707/3 |
| 6,112,198 A | 8/2000 | Lohman et al. ................ | 707/3 |
| 6,112,304 A | 8/2000 | Clawson ..................... | 713/156 |
| 6,115,703 A | 9/2000 | Bireley et al. .................. | 707/2 |
| 6,119,129 A | 9/2000 | Traversat et al. ............ | 707/202 |
| 6,122,627 A | 9/2000 | Carey et al. ..................... | 707/4 |
| 6,182,153 B1 | 1/2001 | Hollberg et al. ............. | 719/315 |
| 6,192,405 B1 | 2/2001 | Bunnell ...................... | 709/225 |
| 6,195,653 B1 | 2/2001 | Bleizeffer et al. .............. | 707/2 |
| 6,199,062 B1 | 3/2001 | Byrne et al. .................... | 707/3 |
| 6,236,997 B1 | 5/2001 | Bodamer et al. ............. | 707/10 |
| 6,356,892 B1 | 3/2002 | Corn et al. ...................... | 707/3 |
| 6,370,522 B1 | 4/2002 | Agarwal et al. ................ | 707/2 |
| 6,728,720 B1 | 4/2004 | Lenzie ....................... | 707/101 |
| 6,732,360 B1 | 5/2004 | Seo et al. .................... | 719/310 |
| 6,879,990 B1 | 4/2005 | Boyer et al. ................ | 707/205 |
| 2001/0037339 A1 | 11/2001 | Harvey ........................ | 707/102 |
| 2002/0059199 A1 | 5/2002 | Harvey ........................... | 707/3 |
| 2003/0191759 A1 | 10/2003 | Harvey ........................... | 707/4 |
| 2003/0208478 A1 | 11/2003 | Harvey ........................... | 707/3 |
| 2006/0020613 A1 | 1/2006 | Harvey ....................... | 707/100 |

FOREIGN PATENT DOCUMENTS

| | | |
|---|---|---|
| GB | 2329044 A | 3/1999 |
| WO | WO 96/07147 | 3/1996 |
| WO | WO 96/34350 | 10/1996 |

OTHER PUBLICATIONS

C.M.R. Leung, An X.500 Directory Implementation Supporting Heterogenous Databases—Proceedings, ACTS, Apr. 22-24, 1991.*
Paul Baker, An Analysis of User Input to an X.500 White Pages Directory Service, IEEE, vol. 3, 1995, 112-125.*
Leung , C.M.R., An object-oriented approach to directory systems, 1990, IEEE, 736-740.*
Bohdan Smetaniuk, Distributed operation of the X.500 directory, 1991, Computer Networks and ISDN System 21, 17-40.*
Bauer et al., A Simulation Model for X.500 Directories: Initial Experiences, 1991, ACM, 255-275.*
G. W. Neufeld, Descriptive names in X.500, 1989, ACM, 64-71.*
Gerald Neufeld, A transactional API for the EAN X.500 directory service, 1992, ACM, 81-91.*

The Proceedings of IREE, ACTS; C.M.R. Leung; An X.500 Directory Implementation Supporting Heterogeneous Databases, Apr. 1991, pp. 85-90.
Bachmann, D., et al.; *Implement LDAP Search Queries with SQL*; ip.com Prior Art Database, Technical Disclosure, 7 pages, Dec. 1, 1998.
Oracle8i; *Designing and Tuning for Performance*; Release 2 (8.1.6); Part No. A76992-01; XP-002229598; 94 pages, Dec. 1999.
European Patent Office, Communication pursuant to Article 96(2) EPC for Application No. 01 930 950.9-1225; 7 pages, Dec. 4, 2006.
S.E. Kille; *Mapping the Global Naming Tree Onto A Relational Database*; Computer Message Systems—85; Elsevier Science Publishers B.V. (North-Holland), pp. 105-114, 1986.
*European Patent Office Communication* for Application No. 03 002 798.1-1225; 6 pages, Jul. 11, 2007.
Communication pursuant to Article 94(3) EPC; Application No. 03 002 797.3-1225, 6 pages, Dec. 16, 2008
EPO Communication pursuant to 94(3) EPC, Application No. 01 930 950.9-1225, 7 pages, Nov. 28, 2008.
USPTO Office Action for U.S. Appl. No. 09/844,043, inventor Richard Hand Harvey, 5 pages, Oct. 29, 2008.
Patent Pending U.S. Appl. No. 11/845,476 entitled "Table Arrangement for a Directory Service and for Related Method and Facilitating Queries for the Directory" by Richard H. Harvey, 86 pages plus 6 pages of drawings, filed Aug. 27, 2007.
United State Patent Office; Office Action for U.S. Appl. No. 09/721,806, filed Nov. 24, 2000 in the name of Richard Hans Harvey; 22 pages, Mar. 31, 2008.
United States Patent Office; Office Action for U.S. Appl. No. 10/300,885, filed Nov. 21, 2002 in the name of Richard Hans Harvey; 12 pages, Apr. 7, 2008.
S.S.B. Shi, et al.; *An Enterprise Directory Solution With DB2*; IBM Systems Journal; vol. 39, No. 2; 0018-8670; pp. 360-383, 2000.
*European Patent Office Examination Report* for Application No. 00 980 695.1; 5 pages, Aug. 4, 2003.
*European Patent Office Examination Report* for Application No. 00 980 695.1; 5 pages, Apr. 3, 2007.
European Communication dated Apr. 2, 1998, all pages.
PCT Written Opinion (PCT Rule 66) dated May 27, 1996, all pages.
PCT Notification of Transmittal of International Preliminary Examination Report dated Dec. 23, 1996, all pages.
PCT Written Opinion (PCT Rule 66) dated Sep. 19, 1996, all pages.
PCT Written Opinion (PCT Rule 66) dated Aug. 5, 1996, all pages.
Communication Pursuant to Article 96(2) EPC Apr. 12, 2001, all pages.
Hung, R. "CCITT X.500 Directories—Principles and Applications" Computer Communications, vol. 15, No. 10, Dec. 1, 1992, pp. 636-645.
Ordille J J et al "Nomenclator Descriptive Query Optimization for Large X.500 Environments" Computer Communications Review, vol. 21, No. 4, Sep. 1, 1991, pp. 185-196.
Bohdan Smetaniuk: "Distributed Operation of the X.500 Directory" Computer networks and ISDN Systems, vol. 21, No. 1, Mar. 1, 1991, pp. 17-40.
The Proceedings of IFIP WG6.6 International Symposium (ISBN: 0444 889 167) Francois Perruchond, Cuno Lanz, & Bernard Plattner "A Relational Data Base Design for an X.500 Directory System Agent"—pp. 405-418, Oct. 26, 1999.
CCITT, vol. VIII, Data Communication Networks Directory Recommendations X.500-X.521 ISBN 92-61-03731-3, Oct. 26, 1999.
"Object-Oriented Modeling and Design" by J. Rumbaugh, et al, 1991, ISBN 0-13-630054-5, pp. 366-396.
Database Design and Management, David Stampler and Wilson Price, 1990 ISBN 0-07-100934-5, pp. 295-323.
Molesworth, R., "An Overview of the CCITT X.500 Directory System" Second IEE National Conference on Telecommunications, No. 1989, Apr. 2, 1989, pp. 179-183.
The Proceedings of IREE, Acts '91, Apr. 22-24, 1991 (ISBN: 0 909394 253), C.M.R Leung "GDSA: An X.500 Directory Implementation Supporting Heterogeneous Databases."; pp. 84-96.
1266 Hewlett-Packard Journal 41 Aug. 1990, No. 4, Palo Alto, CA, US, Directory Services in the HP Map 3.0 Environment; B. Cooke, C Fettig, P. Koski, D. Swope and R. Vandoorn, pp. 15-23.

8178 Data Communications 23 Jan. 1994, No. 1, New York, US "A Big Step Toward A Global Directory", P. Heywood and Elke Gronert, pp. 99-100.
Communication pursuant to 94(3) EPC, Application No. 03 002 798.1-1225; Ref. No. HD/KT/J43358EPA, 8 pages, Jul. 2, 2009.
Kolotyluk, Using X.500 to Facilitate the Creation of Information Systems Federations, MS Degree Thesis, Simon Fraser University, Burnaby, Canada, http://ir.lib.sfu.ca/handle/1892/7914, 117 pages, Dec. 1, 1994.
Communication pursuant to 94(3) EPC, Application No. 03 002 796.5-1225; Ref. No. HD/KT/J43358EPC, 7 pages, Jun. 16, 2009.
USPTO Office Action, U.S. Appl. No. 10/336,769, inventor Richard Harvey, 6 pages, Jan. 23, 2009.
USPTO Office Action, U.S. Appl. No. 10/174,824, inventor Richard Harvey, 6 pages, Mar. 4, 2009.
USPTO Office Action, U.S. Appl. No. 10/300,885, inventor Richard Harvey, 7 pages, Mar. 17, 2009.
Australian Government letter to Smoorenburg, Examiner's First Report on Patent Application No. 2007201141, 2 pages, Sep. 28, 2008.
Australian Government letter to Smoorenburg, Examiner's First Report on Patent Application No. 2007201142, 2 pages, Sep. 28, 2008.
Australian Government letter to Smoorenburg, Examiner's First Report on Patent Application No. 2007201143, 2 pages, Sep. 28, 2008.
Australian Government letter to Smoorenburg, Examiner's First Report on Patent Application No. 2007201145, 2 pages, Sep. 28, 2008.
Australian Government letter to Smoorenburg, Examiner's First Report on Patent Application No. 2007201149, 2 pages, Sep. 28, 2008.
United States Patent Office; Office Action for U.S. Appl. No 10/300,885, filed Nov. 21, 2002 in the name of Richard Hans Harvey; Aug. 6, 2008.
Patent Pending U.S. Appl. No. 09/427,263 entitled *Directory Service System and Method With Tolerance for Data Entry Storage and Output*, by Richard H. Harvey, 92 pages specification plus 6 pages of drawings, filed Oct. 26, 1999.
Jarke, Matthias, et al., *Query Optimization in Database System*, Computing Surveys, vol. 16, No. 2, pp. 111-152, Jun. 1984.
Recommendation X.500, *The Directory—Overview of Concepts, Models and Services*, Melbourne, Fascicle VIII. 8—Rec. X.500, pp. 3-19, 1988.
Leung, C.M.R., *An Object-Oriented Approach to Directory Systems*, IEEE Region 10 Conference on Computer and Communication Systems, Hong Kong, pp. 736-740, Sep. 1990.
Bauer, M.A., et al., *A Simulation Model for X.500 Directories: Initial Experiences*, Department of Computer Science, The University of Western Ontario, pp. 255-276, 1991.
Grumbach, Stephane, *Towards Tractable Algebras for Bags*, Journal of Computer and System Sciences, ACM Princ. of Database Systems, pp. 1-34, 1993.
Hong James, W., et al., *Design and Implementation of a Distributed Applications Testbed*, Department of Computer Science, University of Western Ontario, pp. 170-174, 1993.
Watanabe, Kazunari, et al., *Eliminate Information Inconsistency for X.500 Directory*, NTT Information and Communication Systems Laboratories, pp. 1180-1184, 1994.
Patent Pending U.S. Appl. No. 09/721,806 entitled *A Method and Apparatus for Operating a Database* by Richard H. Harvey, 14 pages specification and 5 pages of drawings, filed Nov. 24, 2000.
United States Patent Office; Office Action for U.S. Appl. No. 10/300,885, filed Nov. 21, 2002 in the name of Richard Hans Harvey, all pages, Aug. 6, 2008.
Won Kim; On Optimizing an SQL-Like Nested Query; ACM Transactions on Database Systems; vol. 7, No. 3; pp. 443-469, Sep. 1982.

* cited by examiner

FIG. 1
OSI DIRECTORY PRODUCTS

| | | | |
|---|---|---|---|
| 3COM | 1 | 0 | 1 |
| ALCATEL TITN | 1 | 1 | 1 |
| BOLDON JAMES | 1 | 0 | 1 |
| BT | 1 | 1 | 1 |
| BRUNEL UNIVERSITY | 1 | 0 | 1 |
| CONTROL DATA SYSTEMS | 1 | 1 | 1 |
| CRAY RESEARCH | 1 | 1 | 1 |
| DATA CONNECTION | 3 | 1 | 2 |
| DIGITAL | 2 | 1 | 2 |
| GPT | 1 | 1 | 1 |
| HEWLETT PACKARD | 1 | 1 | 1 |
| IBM | 5 | 5 | 5 |
| ICL | 5 | 4 | 4 |
| ISODE CONSORTIUM | 1 | 1 | 1 |
| MARBEN PRODUIT | 2 | 2 | 2 |
| MOTOROLA COMP GROUP | 1 | 1 | 0 |
| NCR | 1 | 1 | 1 |
| NEXOR | 3 | 1 | 2 |
| OISWARE | 1 | 1 | 1 |
| OLIVETTI | 1 | 1 | 1 |
| RETIX | 1 | 1 | 1 |
| SIEMENS NIXDORF | 2 | 2 | 2 |
| SOFTWARE KENETICS | 1 | 1 | 1 |
| STRATUS COMPUTER | 2 | 2 | 2 |
| TANDEM COMPUTERS | 2 | 2 | 2 |
| UNISYS | 5 | 5 | 5 |
| WANG | 1 | 1 | 1 |
| WOLLONGONG GROUP | 2 | 2 | 2 |

FIG. 2A

PRINCIPAL DESIGN

REPRESENTING X.500 IN A RDBMS
- DATA EXTENSIBILITY AND COMPLEXITY
- OBJECT ORIENTATED AND HIERARCHICAL

| EMP# | NAME | AGE | SALARY |
|---|---|---|---|

↓ RELATIONAL

| TYPE | SYNTAX | VALUE |
|---|---|---|

↓ X.500

PROPERTY

| OBJECT NAME | PARENT NAME | TYPE | SYNTAX | VALUE |
|---|---|---|---|---|

FUNCTIONAL DECOMPOSITION →

CONCEPTUAL DESIGN

IMPLEMENTING X.500 IN A RDBMS
- ATTRIBUTES AND VALUES
- HIERARCHY AND NAMES
- ALIASES
- DATA TOLERANCE

HIERARCHY

| EID | PARENT | ALIAS | NAME |
|---|---|---|---|

↓

| PARENT | PATH |
|---|---|

↓

| ALIAS | A-EID |
|---|---|

↓

| NAMENORM | NAMERAW |
|---|---|

OBJECT

| EID | AID | VID | DISTING | VALUE |
|---|---|---|---|---|

↓

| NAMENORM | NAMERAW |
|---|---|

ATTRIBUTE

| AID | TYPE | SYNTAX | OBJECTID |
|---|---|---|---|

SERVICE DECOMPOSITION →

FIG. 2B

LOGICAL DESIGN

PERFORMANCE ENHANCEMENTS
FOR RDBMS
- INDEXING OPTION
- I/O CONSIDERATIONS
- MANAGEMENT

DIT

| EID | PARENT | ALIAS | RDN |
|---|---|---|---|

TREE

| EID | PATH |
|---|---|

ALIAS

| EID | A-EID |
|---|---|

NAME

| EID | RAW |
|---|---|

SEARCH

| EID | AID | VID | DISTING | NORM |
|---|---|---|---|---|

ENTRY

| EID | AID | VID | RAW |
|---|---|---|---|

ATTR

| AID | SYX | DESC | OBJECTED |
|---|---|---|---|

PHYSICAL TRANSFORMATION →

PHYSICAL DESIGN

REALIZING X.500 IN A RDBMS
- EFFICIENCY
- PORTABILITY
- FUNCTIONAL EXTENSIBILITY

DIT

| EID | PARENT | RDNKEY | RDN | FLAGS |
|---|---|---|---|---|

TREE

| EID | LEV1 | LEV2 | LEV3 | LEV4 | PATH | FLAGS |
|---|---|---|---|---|---|---|

ALIAS

| EID | A-EID | FLAGS |
|---|---|---|

NAME

| EID | RAW | FLAGS |
|---|---|---|

INFO

| MAXEID | FLAGS |
|---|---|

SEARCH

| EID | AID | VID | NORMKEY | NORM | FLAGS |
|---|---|---|---|---|---|

ENTRY

| EID | AID | VID | RAW | FLAGS |
|---|---|---|---|---|

SENTRY

| EID | AID | VID | VALUE | FLAGS |
|---|---|---|---|---|

BLOB

| EID | AID | VID | VFRAG | RAW | FLAGS |
|---|---|---|---|---|---|

ATTR

| AID | SYX | DESC | OBJECTID | FLAGS |
|---|---|---|---|---|

OCLASS

| OCID | DESC | OBJECTID | MUST LIST | MAY LIST | SUPER LIST | FLAGS |
|---|---|---|---|---|---|---|

TABLE 3b/5a

METADATA IN DIRECTORY SERVICE SYSTEMS AND METHODS

This is a continuation of application Ser. No. 09/427,265 filed Oct. 26, 1999 now abandoned, which is a Divisional of U.S. application Ser. No. 08/793,575 filed Feb. 28, 1997, now U.S. Pat. No. 6,052,681; the above noted prior applications are all hereby incorporated by reference.

BACKGROUND OF THE INVENTION

1. Field of the Invention

The present invention relates to the field of directory services. In particular, the present invention is directed to application of X.500, LDAP and similar services to a relational database, a database design and use of the database to perform X.500 services.

One aspect of the invention relates to the use of metadata, wherein different types of objects are stored together in the same table and in a generic way, in a directory service system and its method of operation.

Other aspects of the present disclosure are directed to an implementation using a RDBMS (Relational Database Management System). The present invention also comprises a property-based table structure and methods of operation of a database application.

2. Description of the Related Art

X.500 is the International Standard for Electronic Directories [CCITT89] or [ITU93]. These standards define the services, protocols and information model of a very flexible and general purpose directory. X.500 is applicable to information systems where the data is fairly static (e.g. telephone directory) but may need to be distributed (e.g. across organisations or countries), extensible (e.g. store names, addresses, job titles, devices etc.), object oriented (i.e. to enforce rules on the data) and/or accessed remotely.

Relational Database Management System (RDBMS) provide facilities for applications to store and manipulate data. Amongst the many features that they offer are data integrity, consistency, concurrency, indexing mechanisms, query optimisation, recovery, roll-back, security. They also provide many tools for performance tuning, import/export, backup, auditing and application development.

RDBMS are the preferred choice of most large scale managers of data. They are readily available and known to be reliable and contain many useful management tools. There is a large base of RDBMS installations and therefore a large amount of existing expertise and investment in people and procedures to run these systems, and so data managers are looking to use this when acquiring new systems. Most relational database products support the industry standard SQL (Structured Query Language).

There has also been a move towards Object Oriented systems which provide data extensibility and the ability to handle arbitrarily complex data items. In addition, many corporations and government departments have large numbers of database applications which are not interconnected. Data managers are looking for solutions which enable them to integrate their data, and to simplify the management of that data. X.500 and it's associated standards provide a framework and a degree of functionality that enables this to be achieved. The fact that X.500 is an international standard means that data connectivity can be achieved across corporations and between different countries.

The problem, therefore, is to address the need of data managers and implement X.500 with all the flexibility of object-oriented systems but using an SQL product so that it can achieve the scalability and performance inherent in relational systems coupled with the stability, robustness, portability and cost-effectiveness of current SQL products.

There have been a number of attempts of solving the above problem and over a considerable period of time. None of the attempts have resulted in a product which has proven to be commercially accepted by the market, and thus in the market place there is a long felt need yet to be addressed.

FIG. 1 shows an abstract from the "GOSIPNews" issue No. 4, dated April 1994 (Source: "Interoperability Products" distributed in Australia by the Centre for Open Systems) and which lists X.500 products currently available. None of these products use a SQL database as an underlying data store, and none of these products therefore address successfully the market need of implementing X.500 using an SQL RDBMS.

The Proceedings of IFIP WG6.6 International Symposium (ISBN: 0444 889 167) have published a paper presented by Francois Perruchond, Cuno Lanz, and Bernard Plattner and entitled "A Relational Data Base Design for an X.500 Directory System Agent". The Directory System disclosed, as with many prior art systems, is relatively slow in operation, particularly where the database is relatively extensive and is incomplete in its implementation of X.500, such as aliases, subsearch and entry information.

Another attempt is disclosed in the proceedings of IREE, ISBN 0909 394 253, proceedings Apr. 22-24, 1991 by C. M. R. Leung. In that disclosure, there is described a database scheme in which a single entry table holds detailed information about each directory object, and is also incomplete in its implementation of X.500.

This approach has been discredited by a number of text books and knowledge in the art, such as "Object-Oriented Modeling and Design" by J. Rumbaugh, et al, 1991, ISBN 0-13-630054-5, in which at paragraph 17.3.8 it is clearly stated that "putting all entities in the one table is not a good approach to relational database design".

As noted above, there have been a number of attempts made to address prior art problems, but none of the attempts have resulted in a product which has proven to be commercially accepted by the market. Of interest in this application, are the solutions of problems that are associated with indexing, extensibility and scalability.

SUMMARY OF INVENTION

An object of the present inventions is to address problems associated with indexing, extensibility and scalability, or at least one of the prior art problems.

One aspect of the invention resides in representing the X.500 attributes of the prior art, that previously required separate columns for respective data types:

| empl # name | age | salary, |
|---|---|---| as a plurality of generic columns:

| type | syntax | value, |
|---|---|---| the latter representation being an extensible representation that forms a basic principal design. Because of the extensible nature of the principal design, the latter representation is adapted to implementation with SQL. In other words, prior art representations are arranged in 'column(s) per data type', whereas the present invention is arranged in 'row(s) per data and value type'. The latter representation is known as meta-data. The meta-data "value" may be binary.

A further feature of the invention is realised by the application of the metadata representation to directory services, such as X.500 or LDAP. This application is realised by the provision of a 'property table', in which a column defining distinguishable objects by name and parent name is added to the principal design.

The present invention also provides a method of representing, storing and/or processing directory services, such as X.500 or LDAP, which contain objects having attributes, the improvement being representing, storing and/or processing the attributes in the form of type, syntax, and value. This leads to relatively efficient implementation of directory services in a relational database.

Further, benefits accrue from the aspects and implementation of a metadata-based directory service, including:

a. independence of size—the implementation disclosed has the ability to be scaled, b. independence of depth of tree—the implementation disclosed has hierarchy comparability, c. performance—if index is put on the type column, then each and every type is indexed.

A detailed description of the present invention can be found in the following text, at least in section numbers 1 and 2 in the Summary of Invention and section 1.1 of the description of the preferred embodiments and the related Figures.

With regard to the remainder of the specification as a whole, in general, it seeks to disclose a number of other inventions related to the implementation of X.500 services in a RDBMS which supports SQL or any other relational language. X.500 services can be invoked via a number of protocols, such as X.500 and LDAP.

The scope of the present invention is outlined in this specification, including the claims.

In this document, at the time of filing, SQL is the most popular relational language and although it is only one form of relational language, the intent of the present invention is to have application to any other form of relational language, not just SQL.

These inventions can be related to the following headings:

| | |
|---|---|
| 1. | Principal Design |
| 2. | Conceptual Design |
| 3. | Conceptual Method(s) |
| 4. | Logical Design |
| 5. | Logical Method(s) |
| 6. | Physical Design |
| 7. | Example Implementation |

The X.500 standard in no way dictates how the directory is to be implemented, only its capabilities and behaviour. One key to solving the implementation problem is the realisation that X.500 defines a fixed set of services (e.g. Add, Modify, Search etc.) that can operate on arbitrary data.

It has been discovered that problems associated with the prior art may be alleviated by a unique approach, by what may be described as inverting relational theory modeling from a data modeling approach to a service modeling approach. That is, from the problem of:

processing arbitrary queries on a fixed set of data to the present approach of processing arbitrary data using a fixed set of queries/services.

Each service is modelled (instead of each data type) and the relationships between each service defined (instead of the relationships between each data type).

Implementation of service modeling using relational queries to satisfy X.500 services enables benefits of RDBMS to be exploited.

The benefits of this approach are many. A summary is illustrated in FIG. 3. Some of the benefits include:

relatively fast starting time.

the ability to reduce memory requirements relative to memory resident systems.

the ability to base X.500 on any SQL database and thereby protect the investment in products, expertise and procedures in managing existing systems.

the ability to achieve performance relatively independent of size and relatively independent of the complexity of the data type. Every data type is treated generically. Every data type has an index on it. The result of indexing gives the ability to efficiently search the directory without caching large portions of directory into memory. Unlike the prior art where either only one index can be used to satisfy one given query or large portions of information is system intensively cached and searched in memory.

the ability to support different languages (e.g. Spanish, Hebrew and Kanji) which may have various collating sequences. Single, double or other byte character sets may also be supported.

using a disk based model to minimise I/O and efficiently retrieve I/O.

the ability to service complex X.500 searches.

the ability to create X.500 databases of far greater size than previously possible, without compromising performance or robustness. The databases can be small or large (250,000, 1 million or more entries).

an optimal table design minimises wastage of disk space.

the ability to leverage off hundreds of man years of relational database developments and use "industrial strength" databases with proven reliability, integrity, security and tools for developing high performance applications.

Based on this unique approach, the following disclosure will detail a number of inventions in an order with reference to FIGS. 2A and 2B, which illustrates schematically an overview of the present X.500 system. The table and column, names, order of columns and numeric values disclosed are given on an arbitrary basis in the overview. The number of columns disclosed represent a preferred operable requirement. Additional columns do not alter the use of the table as herein contemplated.

BRIEF DESCRIPTION OF THE DRAWINGS

FIG. 1 is an illustration of a table that lists X.500 products currently available, none of which use a SQL data base as an underlying data store.

FIG. 2A is an illustration schematically of an overview of the present invention, particularly the principal design and the corresponding conceptual design, as applied to the provision of a table structure for an X.500 system.

FIG. 2B is an illustration schematically of an overview of the present invention, particularly the logical design and the corresponding physical design, as applied to the provision of a table structure for an X.500 system.

DESCRIPTION OF THE PREFERRED EMBODIMENTS

1. Principal Design

Figure 3:
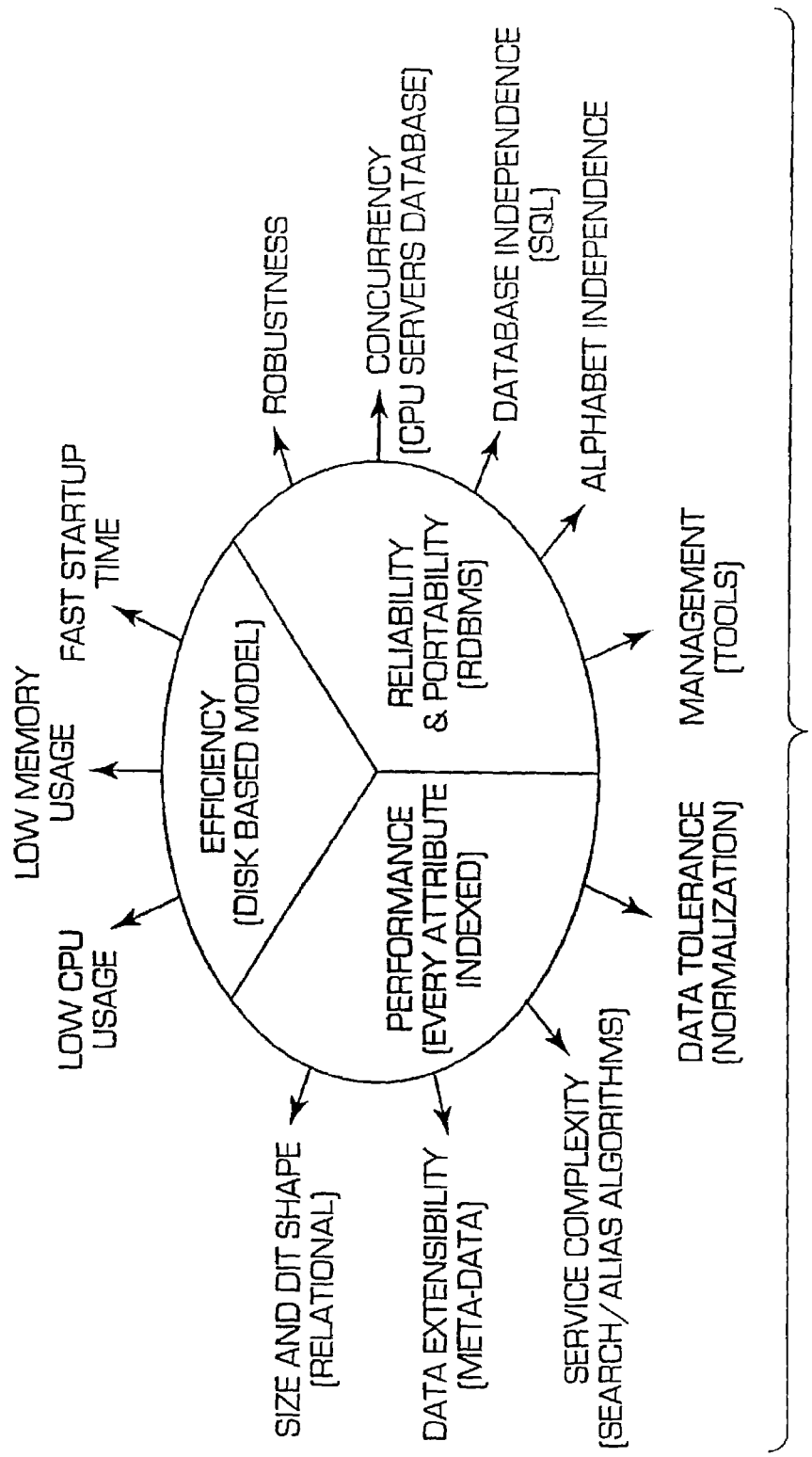
FIG. 3 is an illustration of a pie chart that provides a summary representation of the benefits of implementing service modeling using relational queries to satisfy X.500 services.

The X.500 prior art attempts at implementation have been unable to overcome the relatively basic structural and operational differences between the X.500 requirements and functionality and SQL. The X.500 standard has a particular structure by nature, whereas SQL is designed to operate on relational structured tables.

For a typical relational database application, the nature of data is well known, i.e. tables will consist of a number of columns and each column contains data relating to a particular data type (see Table B1). The different data types that can be stored is limited to the columns of the table. The data types are also limited to the types supported by the database (e.g. string, numeric, money, date). The database may also store data of a form not understood by the database per se, but understood by the application e.g. binary data.

TABLE B1

Employee Table

| Name | Surname | Title | Phone |
|------|---------|-------|-------|
| Chris | MASTERS | Sales Manager | 03 727-9456 |
| Alana | MORGAN | Sales Support | 03 727-9455 |
| ... | ... | ... | ... |

If a new data type needs to be added (e.g. mobile) then a new column will have to be added to the table. This can cause problems if data table changes are not easy to implement. Also if the new data type is not well used (e.g. less than 1% of the organisation) then significant redundant data storage may result. See Table B2.

TABLE B2

Employee Table

| Name | Surname | Title | Phone | Mobile |
|------|---------|-------|-------|--------|
| Chris | MASTERS | Sales Manager | 03 727-9456 | 018 042671 |
| Alana | MORGAN | Sales Support | 03 727-9455 | |
| ... | ... | ... | ... | ... |

In essence, one invention in the application of X.500 resides in overcoming the extensibility by representing the X.500 attributes of the prior art:

| empl # name | age | salary |
|---|---|---| as described above, as

| type | syntax | value, |
|---|---|---| the latter representation being an extensible representation and is thus adapted to implementation with SQL. The latter representation is known as meta-data. The meta-data "value" may be binary.

A further development based on the above principal design is the adaption of the 'principal design' to X.500. This adaption has been realised by the provision of a 'property table', in which object name and parent name is added to the 'principal design'.

Further benefits accrue from the implementation disclosed above; including:

a. independence of complexity of filter—the implementation disclosed may utilise a query optimiser provided in SQL, and therefore there is no need to replicate a query optimiser in each proprietary database to which the present invention is applied, b. independence of size—the implementation disclosed has the ability to be scaled, c. independence of depth of tree—the implementation disclosed has hierarchy comparability, d. performance—if index is put on the type column, then each and every type is indexed.

2. Conceptual Design

The prior art has had difficulty in implementing X.500 as it has not been structured for extensibility, object oriented and hierarchy which are requirements of X.500.

This is addressed, in one form, by functionally decomposing the 'property table' and thus resulting in what is called the Conceptual Design.

The conceptual design resides in providing at least one of:

1. Attribute table, where extensibility is addressed by allowing the definition of a new attribute type in this table by adding a row to the table;

2. Object table, which defines the attributes within each object; and/or

3. Hierarchy table, which defines the relationship between the objects.

In another invention, this problem is addressed by providing table structures in accordance with those disclosed in FIGS. 2A and 2B.

Yet further inventions reside in addressing problems of data tolerance by providing in the present X.500 system for the replacement of the 'value' column of the object table with value 'norm' and value 'raw' columns and/or replacing the RDN column in the hierarchy table with 'name norm' and 'name raw' columns.

Further, the difficulty in prior art of accommodating aliases is addressed in the present X.500 system by providing an 'alias' column in the hierarchy table. The 'alias' column is flagged to indicate that, that entry is an alias.

Further refinement may be provided by replacing the 'alias' column with alias and A-EID columns. The A-EID provides information about where the alias points.

Still further refinement may be provided by replacing the 'parent' column in the hierarchy table with 'parent' and 'path' columns.

The 'path' addresses the problem of implementing X.500 search, with aliases and subtrees. The 'path' has at least two unique properties: a) to determine the absolute position in the hierarchy; and b) it is used to determine if an entry is in a given subtree by its prefix.

3. Conceptual Method

A number of unique methods of interrogating the conceptual design are disclosed in the detailed description following, including:

a) mapping the X.500 services into a sequence of SQL statements;

b) the search strategy is to apply the filter over the search area using the path or parent columns, and/or;

c) in dealing with aliases during navigation—where an alias points is cached In the A EID column;

d) in dealing with alias during search—find the unique set of base objects which define areas of the tree that need to be searched, and then apply b) above to each area of the tree.

A further invention is realised by using the attribute table for incoming data to find the AID from the X.500 object ID and Outgoing data read from the database, vice versa.

Furthermore, for any incoming distinguished name, it is navigated to its appropriate EID, then each search is performed as required by X.500.

Still furthermore, for a search, filter and subtree searches can be provided by a single pass resolution and using the path column. One invention is to utilise a 'path' field to simultaneously apply an arbitrary filter over an arbitrary subtree. The complications of aliases is handled by applying the above method to a uniquely resolved subtree.

Yet another unique method is to store the "path" of each entry as a string. Each path will then be prefixed by the path of its parent entry. This is useful for the filter in the search service.

4. Logical Design

The logical design is based on a service decomposition of the conceptual design, though the realisation that X.500 service components are independent.

The advantages accruing from this include:

1. Reduces the number of indexes per table, as more tables are provided. It has been found that primary indexes are most efficient (speed, size) and secondary indexes may have large overheads (speed, size).

2. Enable data in tables to be clustered. Clustering occurs as a result of its primary key (storage structure) and thus data may be organised on disk around its key. E.g. for the 'search' table, surnames may be clustered together.

3. Management—smaller tables are easier to manage, e.g. faster to update indexes, collect statistics, audit, backup, etc.

4. Reduced I/O—speed improvements due to smaller rows, means more rows per page and thus operations perform less I/O's.

5. Logical Methods

A number of unique methods of interrogating the logical design tables are disclosed in the detailed description following.

In addition, one method resides in caching the attribute table. Thus, (with the exception of initial loading) no SQL statements are issued to the database. In the present X.500 system, conversions are performed in memory. This provides a substantial speed advantage.

Further, validation is performed in memory which avoids database roll-back. Roll-backs are time and system consuming.

Still further, for the arbitrary filter, a dynamic SQL equivalent is built. This enables arbitrary complexity in X.500 searches.

Also for search results, the present system utilises set orientation queries of SQL to avoid 'row at a time' processing. Thus search results may be assembled in parallel in memory.

6. Physical Design

New tables and new columns are introduced to overcome column width and key size restrictions and to achieve space optimisations.

The following text is a disclosure of embodiments of the inventions outlined:

1. Principal Design

With reference to FIG. 2A, the principal design addresses the basic problem of representing the extensible, object oriented and hierarchical nature of X.500 in relational tables. In this section it will be disclosed (with examples) that the principal table design can be represented by a single table as shown in Table 1 below.

TABLE 1

X.500 Property Table

| object name | parent name | type | syntax | value |

Throughout this and the following sections all column names and their positions in each table are arbitrary. The intent is to define What they contain and how they are used.

1.1 Extensibility

For a typical relational database application, the nature of data is well known, i.e., tables will consist of a number of columns and each column contains data relating to a particular data type (see Table 1.1a). The table is self descriptive, i.e. the relations between data items is implied by being on the same row (this is the basis of relational theory).

TABLE 1.1a

Typical relational table

| name | surname | title | phone |
|---|---|---|---|
| Chris | MASTERS | Sales Manager | 03 727-9456 |
| Alana | MORGAN | Sales Support | 03 727-9455 |
| ... | ... | ... | ... |

However, the above approach is not extensible because the number of different data types is limited to the number of columns of the table. If a new data type needs to be added (e.g. mobile phone number) then a new column will have to be added to the table (see Table 1.1b). Any application accessing this table will need to be updated to explicitly query it.

TABLE 1.1b

Relational table with an extra column

| name | surname | title | phone | mobile |
|---|---|---|---|---|
| Chris | MASTERS | Sales Manager | 03 727-9456 | 018 042671 |
| Alana | MORGAN | Sales Support | 03 727-9455 | |
| ... | ... | ... | ... | ... |

Other problems also exist in practice. If the new data type is not well used (e.g. less than 1% of the organisation has a mobile phone) then the table will be sparse (e.g. if a given person does not have a mobile then that row/column entry will be NULL). Also, the data types are limited to the types supported by the database (e.g. string, numeric, money, date, etc.).

The solution is to treat the data types as generic. The present invention adopts the method of representing arbitrary attributes (e.g. XOM [X/OPEN Object Management] API

[Application Programming Interface]) as a type, syntax, value combination (see Table 1.1c)

TABLE 1.1c

Representing arbitrary attributes

| type | syntax | value |
|---|---|---|
| Name | String | Chris |
| Surname | String | MASTERS |
| Title | String | Sales Manager |
| Phone | Numeric | 03 727-9456 |
| Mobile | Numeric | 018 042671 |

1.2 Object Oriented

X.500 defines objects (e.g. people, organisations, etc.) which may contain an arbitrary number of "attributes". Since many objects must appear in the table a mechanism is required to distinguish each object. An "object name" column is added to the table for this purpose (see Table 1.2a).

TABLE 1.2a

Representing objects with arbitrary values

| object name | type | syntax | value |
|---|---|---|---|
| Chris Masters | Name | String | Chris |
| Chris Masters | Surname | String | MASTERS |
| Chris Masters | Title | String | Sales Manager |
| Chris Masters | Phone | Numeric | 03 727-9456 |
| Chris Masters | Mobile | Numeric | 018 042671 |
| Alana Morgan | Name | String | Alana |
| Alana Morgan | Surname | String | MORGAN |
| Alana Morgan | Title | String | Sales Support |
| Alana Morgan | Phone | Numeric | 03 727-9455 |

The above method allows any number of attributes to be assigned (related) to an entry. These attributes could be of arbitrary complexity (e.g. a multi-line postal address could be handled). As the number of columns is fixed new attributes can be added to any object without having to redefine the application. If a new attribute is added then an application that reads the entry will get back an extra row.

1.3 Hierarchical

A method of representing hierarchical systems (e.g. parts explosion) is to use a parent/child combination (see Table 1.3a)

TABLE 1.3a

Parts explosion hierarchy

| parent | child |
|---|---|
| car | engine |
| car | fuel system |
| ... | ... |
| engine | carburettor |
| engine | pistons |
| ... | ... |
| carburettor | fuel valve |
| carburettor | air valve |
| ... | ... |

X.500 defines its objects to be hierarchical. The relationships between objects follow a tree structure where each object has a parent object and each parent can have zero or more children. This relationship can be represented in a general PROPERTY table by the addition of a "parent name" column, which is used to store the name of the parent object (see Table 1.3b).

FIG. 1.3b - X.500 Property Table

| object name | parent name | type | syntax | value |
|---|---|---|---|---|
| Datacraft | root | Organisation | String | Datacraft |
| Datacraft | root | Address Postal Address | Postal Address | PO Box 353 Croydon VIC |
| Chris Masters | Datacraft | Name | String | Chris |
| Chris Masters | Datacraft | Surname | String | MASTERS |
| Chris Masters | Datacraft | Title | String | Sales Manager |
| Chris Masters | Datacraft | Phone | Numeric | 03 727-9456 |
| Chris Masters | Datacraft | Mobile | Numeric | 018 042671 |
| Alana Morgan | Datacraft | Name | String | Alana |
| Alana Morgan | Datacraft | Surname | String | MORGAN |
| Alana Morgan | Datacraft | Title | String | Sales Support |
| Alana Morgan | Datacraft | Phone | Numeric | 03 727-9455 |

Note that the root of the tree has no parent. Thus, if both Chris and Alana work for Datacraft and Datacraft is a child of the root then we can say that Chris and Alana are children of Datacraft and that Datacraft is the parent of Chris and Alana.

2. Conceptual Design

In Section 1 it was shown that a single Property Table could represent the extensible, object oriented and hierarchical nature of X.500 (see Table 2a).

TABLE 2a

Property Table

| object name | parent name | type | syntax | value |
|---|---|---|---|---|

With reference to FIG. 2A in this section it will be shown that full X.500 functionality can be represented by using three tables as shown below (see Table 2b and FIG. 2A).

TABLE 2b

Full Conceptual Design

Hierarchy Table

| EID | Parent | Path | Alias | A_EID | NameNorm | NameRaw |
|---|---|---|---|---|---|---|

Object Table

| EID | AID | VID | Disting | ValueNorm | ValueRaw |
|---|---|---|---|---|---|

Attribute Table

| AID | Type | Syntax | ObjectId |
|---|---|---|---|

The conceptual design addresses major problems with implementing full X.500 functionality in relational tables. As each major design issue is presented, examples are provided to illustrate the solution.

2.1 Functional Decomposition

The Property Table (FIG. 2A) can be decomposed into separate tables that reflect the hierarchical, object oriented and extensible nature of X.500, preferably as follows;

a Hierarchy Table which defines the structural relationship between objects.

an Object Table which defines the attribute values within each object.

an Attribute Table which defines the different attribute types.

These tables result from a process called functional decomposition.

To address the problem of correlating the relationships between tables, arbitrary identifiers are introduced. The EID or "entry identifier" correlates each object hierarchy information. The AID or "attribute identifier" correlates each value in the object table with its attribute information.

The design is considered very efficient because the repeating groups in the Property table (type-syntax and object name-parent name) have been removed. Also, for SQL, joining columns are simple integers.

TABLE 2.1

Basic Conceptual Design

Hierarchy Table

| EID | Parent | Name |
|---|---|---|
| 10 | 0 | Datacraft |
| 30 | 10 | Chris Masters |
| 31 | 10 | Alana Morgan |

Object Table

| EID | AID | Value |
|---|---|---|
| 10 | 10 | Datacraft |
| 10 | 16 | PO Box 123 CROYDON |
| 30 | 3 | Chris |
| 30 | 4 | MASTERS |
| 30 | 12 | Sales Manager |
| 30 | 20 | 03 727-9456 |
| 31 | 3 | Alana |
| 31 | 4 | MORGAN |
| 31 | 12 | Sales Support |
| 31 | 20 | 03 727-9455 |

Attribute Table

| AID | Type | Syntax |
|---|---|---|
| 3 | Name | string |
| 4 | Surname | string |
| 10 | Organisation | string |
| 12 | Title | string |
| 16 | Postal Address | address string |
| 20 | Phone | telephone string |

2.2 X.500 Attributes

X.500 attributes have a protocol identifier which is transferred when any data is communicated between end systems. These identifiers are internationally defined and are called OBJECT IDENTIFIERS (e.g. 2.5.4.4 means a surname string). Thus an "ObjectId" column can be added to the Attribute table so that conversions between X.500 object identifiers and the internal attribute identifiers can be performed.

In addition, X.500 allows an attribute to have an arbitrary number of values (e.g. the mobile phone could be treated just as a second telephone number). Thus a "value identifier" or VID is introduced to identify values within an attribute in the Object Table.

TABLE 2.2

Conceptual Design with X.500 attributes

Hierarchy Table

| EID | Parent | Name |
|---|---|---|
| 10 | 0 | Datacraft |
| 30 | 10 | Chris Masters |
| 31 | 10 | Alana Morgan |

Object Table

| EID | AID | VID | Value |
|---|---|---|---|
| 10 | 10 | 1 | Datacraft |
| 10 | 16 | 1 | PO Box 123 CROYDON |
| 30 | 3 | 1 | Chris |
| 30 | 4 | 1 | MASTERS |
| 30 | 12 | 1 | Sales Manager |
| 30 | 20 | 1 | 03 727-9456 |
| 30 | 20 | 2 | 018 042671 |
| 31 | 3 | 1 | Alana |
| 31 | 4 | 1 | MORGAN |
| 31 | 12 | 1 | Sales Support |
| 31 | 20 | 1 | 03 727-9455 |

Attribute Table

| AID | Type | Syntax | ObjectId |
|---|---|---|---|
| 3 | Name | string | 2.5.4.3 |
| 4 | Surname | string | 2.5.4.4 |
| 10 | Organisation | string | 2.5.4.10 |
| 12 | Title | string | 2.5.4.12 |
| 16 | Postal Address | address string | 2.5.4.16 |
| 20 | Phone | telephone string | 2.5.4.20 |

2.3 X.500 Names

X.500, each entry uses one or more of its attribute values (Distinguished Values) for naming the entry. A "Disting" column is added to the Object Table to flag the distinguished values.

The Distinguished Values combine to form a Relative Distinguished Name (RDN) which names the entry. The "Name" column in the Hierarchy table stores the RDN. This is an optimisation that negates the need for the RDN to be constructed from the distinguished values in the Object table.

An entry is uniquely named by a Distinguished Name (DN) which consists of all the RDN's of the of-its ancestors down from the root and the RDN of the object itself. An innovation is to add a "path" column to the Hierarchy table which defines the absolute position of the entry in the tree as a list of EID's. The path has three important properties;

1) enables fast construction of DN's, (the EID list defines all the RDN's)

2) enables fast subtree searches (see Conceptual Methods), 3) it is independent of its DN (any of the RDN's in the DN can be renamed without affecting the path).

TABLE 2.3

Conceptual Design with X.500 attributes and names

Hierarchy Table

| BID | Parent | Path | Name |
|---|---|---|---|
| 10 | 0 | 10. | Datacraft |
| 30 | 10 | 10.30. | Chris, MASTERS |
| 31 | 10 | 10.31. | Alana, MORGAN |

Object Table

| BID | AID | VID | Disting | Value |
|---|---|---|---|---|
| 10 | 10 | 1 | 1 | Datacraft |
| 10 | 16 | 1 | 0 | PO Box 123 CROYDON |
| 30 | 3 | 1 | 1 | Chris |
| 30 | 4 | 1 | 1 | MASTERS |
| 30 | 12 | 1 | 0 | Sales Manager |
| 30 | 20 | 1 | 0 | 03 727-9456 |
| 30 | 20 | 2 | 0 | 018 042671 |
| 31 | 3 | 1 | 1 | Alana |
| 31 | 4 | 1 | 1 | MORGAN |
| 31 | 12 | 1 | 0 | Sales Support |
| 31 | 20 | 1 | 0 | 03 727-9455 |

Attribute Table

| AID | Type | Syntax | ObjectId |
|---|---|---|---|
| 3 | Name | string | 2.5.4.3 |
| 4 | Surname | string | 2.5.4.4 |
| 10 | Organisation | string | 2.5.4.10 |
| 12 | Title | string | 2.5.4.12 |
| 16 | Postal Address | address string | 2.5.4.16 |
| 20 | Phone | telephone string | 2.5.4.20 |

2.4 X.500 Aliases

X.500 also has the concept of 'aliases'. An alias object effectively points to entry and thus provides an alternate name for that entry. Thus an "alias" flag is added to the Hierarchy Table. When an alias is discovered during Navigation (i.e. the supplied DN contains an alias), then the alias value must be read from the Object Table. This alaias DN must be resolved to where the alias points before Navigation of the original entry can continue.

An innovation is to use an "aliased EID" column or A_EID to store "where" the alias "points to". This removes the need to repeatedly navigate through an alias.

TABLE 2.4

Conceptual Design with X.500 attributes, names and aliases

Hierarchy Table

| EID | Parent | Path | Alias | A_EID | Name |
|---|---|---|---|---|---|
| 10 | 0 | 10. | 0 | 0 | Datacraft |
| 30 | 10 | 10.30. | 0 | 0 | Chris, MASTERS |
| 31 | 10 | 10.31. | 0 | 0 | Alana, MORGAN |
| 35 | 10 | 10.35. | 1 | 31 | Support Engineer |

Object Table

| EID | AID | VID | Disting | Value |
|---|---|---|---|---|
| 10 | 10 | 1 | 1 | Datacraft |
| 10 | 16 | 1 | 0 | PO Box 123 CROYDON |
| 30 | 3 | 1 | 1 | Chris |
| 30 | 4 | 1 | 1 | MASTERS |
| 30 | 12 | 1 | 0 | Sales Manager |
| 30 | 20 | 1 | 0 | 03 727-9456 |
| 30 | 20 | 2 | 0 | 018 042671 |
| 31 | 3 | 1 | 1 | Alana |
| 31 | 4 | 1 | 1 | MORGAN |
| 31 | 12 | 1 | 0 | Sales Support |
| 31 | 20 | 1 | 0 | 03 727-9455 |
| 35 | 4 | 1 | 1 | Support Engineer |
| 35 | 7 | 1 | 0 | Datacraft/Alana, Morgan |

Attribute Table

| AID | Type | Syntax | ObjectId |
|---|---|---|---|
| 1 | Alias Name | Distinguished Name | 2.5.4.1 |
| 3 | Name | string | 2.5.4.3 |
| 4 | Surname | string | 2.5.4.4 |
| 10 | Organisation | string | 2.5.4.10 |
| 12 | Title | string | 2.5.4.12 |
| 16 | Postal Address | address string | 2.5.4.16 |
| 20 | Phone | telephone string | 2.5.4.20 |

2.5 X.500 Data Tolerance

Every X.500 attribute has a (internationally defined) syntax. X.500 attribute syntaxes define how each attribute should be treated. In all string syntaxes (e.g. Printable, Numeric etc.) superfluous spaces should be ignored. In some syntaxes the case is not important (e.g. Case Ignore String and Case Ignore List) and so the names "Chris Masters", "Chris MASTERS" and "ChRis MaSTeRS" are considered identical.

In order to do comparisons (e.g. search for a particular value), the syntax rules can be applied to create a normalised form (e.g. "CHRIS MASTERS"). If this normalised form is stored in the database, then any variations in input form are effectively removed, and exact matching can be used (which is necessary when using SQL).

Both the normalised data and "raw" data are stored in the database. The "raw" necessary so that users can retrieve the data in exactly the same format as it was originally input. As per the X.500 and LDAP standard, data received from a user, raw data, accords with ASN.1 (Abstract Syntax Notation No.1). Thus the "Name" column in the Hierarchy Table becomes the "NameRaw" and a "NameNorm" column is added. Similarly, the "Value" column in the Object Table becomes the "ValueRaw" and a "ValueNorm" column is added.

TABLE 2.5

Full Conceptual Design

Hierarchy Table

| EID | Parent | Path | Alias | A_EID | NameNorm | NameRaw |
|---|---|---|---|---|---|---|
| 10 | 0 | 10. | 0 | 0 | DATACRAFT | Datacraft |
| 30 | 10 | 10.30. | 0 | 0 | CHRIS, MASTERS | Chris, MASTERS |
| 31 | 10 | 10.31. | 0 | 0 | ALANA, MORGAN | Alana, MORGAN |
| 35 | 10 | 10.35. | 1 | 31 | SUPPORT ENGINEER | Support Engineer |

TABLE 2.5-continued

Full Conceptual Design

Object Table

| EID | AID | VID | Disting | ValueNorm | ValueRaw |
|---|---|---|---|---|---|
| 10 | 10 | 1 | 1 | DATACRAFT | Datacraft |
| 10 | 16 | 1 | 0 | PO BOX 123 CROYDON | PO Box 123 CROYDON |
| 30 | 3 | 1 | 1 | CHRIS | Chris |
| 30 | 4 | 1 | 1 | MASTERS | MASTERS |
| 30 | 12 | 1 | 0 | SALES MANAGER | Sales Manager |
| 30 | 20 | 1 | 0 | 037279456 | 03 727-9456 |
| 30 | 20 | 2 | 0 | 018321435 | 018 042671 |
| 31 | 3 | 1 | 1 | ALANA | Alana |
| 31 | 4 | 1 | 1 | MORGAN | MORGAN |
| 31 | 12 | 1 | 0 | SALES SUPPORT | Sales Support |
| 31 | 20 | 1 | 0 | 037279455 | 03 727-9455 |
| 35 | 4 | 1 | 1 | SUPPORT ENGINEER | Support Engineer |
| 35 | 7 | 1 | 0 | DATACRAFT / ALANA MORGAN | Datacraft/Alana, Morgan |

Attribute Table

| AID | Type | Syntax | ObjectId |
|---|---|---|---|
| 1 | Alias Name | Distinguished Name | 2.5.4.1 |
| 3 | Name | Case Ignore String | 2.5.4.3 |
| 4 | Surname | Case Ignore String | 2.5.4.4 |
| 10 | Organisation | Case Ignore String | 2.5.4.10 |
| 12 | Title | Case Ignore String | 2.5.4.12 |
| 16 | Postal Address | Case Ignore List | 2.5.4.16 |
| 20 | Phone | Telephone String | 2.5.4.20 |

3. Conceptual Methods

This section introduces the basic X.500 services and shows how the conceptual design, shown in Table 3a or FIG. 2A, is sufficient to implement X.500 services and their complexities.

TABLE 3a

Conceptual Table Design

Hierarchy Table

| EID | Parent | Path | Alias | A_EID | NameNorm | NameRaw |
|---|---|---|---|---|---|---|

Object Table

| EID | AID | VID | Disting | ValueNorm | ValueRaw |
|---|---|---|---|---|---|

Attribute Table

| EID | Type | Syntax | ObjectID |
|---|---|---|---|

Figure 4:
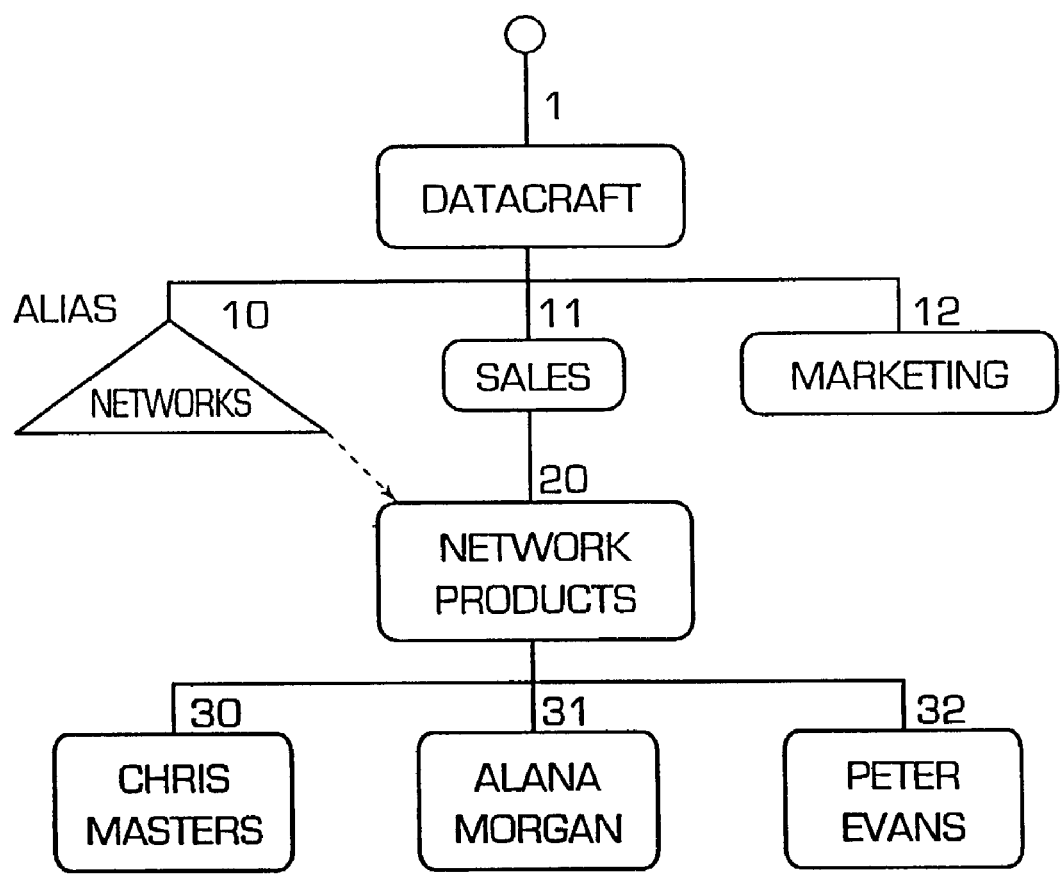
FIG. 4 is an illustration of a hierarchy within a hypothetical organization, arranged as a tree, that is used to explain the services that may be provided according to the present invention.

The example hierarchy shown in Table 3b, as seen in FIG. 4, will be used to illustrate these services. Each name in the diagram represents an object entry in the database. The triangle represents an alias entry, and the dotted line represents the connection between the alias entry and the object that it points to. The numbers next to each entry are the entry EID's.

In the example, entry "1" has an RDN with a value of "Datacraft", entry "11" has an RDN with a value of "Sales", entry "20" has an RDN with a value of "Network Products" and entry "31" has an RDN with a value of "Alana Morgan". The DN of entry "31" is made up of a sequence of RDN's, namely, "Datacraft", "Sales", "Network Products", "Alana Morgan".

The alias entry "Datacraft/Networks" points to the entry "Datacraft", "Sales", "Network Products". When navigating to this entry the navigate process would find the alias entry, then find the DN of the object pointed to by the alias and then navigate from the root to the object entry returning an FID of "20" and a path of "1. 11.20.".

Listed below are sample tables which show how data is stored. The Hierarchy table (Table 3c) shows how the entries for the example hierarchy are stored. The Attribute table (Table 3e) shows attributes which are contained in the entry "Datacraft/Sales/Network Products/Chris Masters". The Object table (Table 3d) shows how the values of these attributes are stored.

TABLE 3c

Sample Hierarchy Table

| EID | Parent | Path | Alias | A_EID | NameNorm | NameRaw |
|---|---|---|---|---|---|---|
| 1 | 0 | 1. | 0 | 0 | DATACRAFT | [Datacraft] |
| 10 | 1 | 1.10. | 1 | 20 | NETWORKS | [Networks] |
| 11 | 1 | 1.11. | 0 | 0 | SALES | [Sales] |
| 12 | 1 | 1.12. | 0 | 0 | MARKETING | [Marketing] |
| 20 | 11 | 1.11.20. | 0 | 0 | NETWORK PRODUCTS | [Network Products] |
| 30 | 20 | 1.11.20.30. | 0 | 0 | CHRIS MASTERS | [Chris Masters] |
| 31 | 20 | 1.11.20.31. | 0 | 0 | ALANA MORGAN | [Alana Morgan] |
| 32 | 20 | 1.11.20.32. | 0 | 0 | PETER EVANS | [Peter Evans] |

TABLE 3d

Sample Object Table

| EID | AID | VID | Disting | ValueNorm | ValueRaw |
|-----|-----|-----|---------|-----------|----------|
| 30 | 3 | 0 | 1 | CHRIS | [Chris] |
| 30 | 4 | 0 | 1 | MASTERS | [Masters] |
| 30 | 12 | 0 | 0 | SALES MANAGER | [Sales Manager] |
| 30 | 20 | 0 | 0 | 03 727 9456 | [(03) 727-9456] |
| 30 | 20 | 1 | 0 | 018 042 671 | [(018) - 042 671] |

TABLE 3e

Sample Attribute Table

| AID | Type | Syntax | ObjectID |
|-----|------|--------|----------|
| 3 | commonName | caseIgnoreString | 2.5.4.3 |
| 4 | surname | caseIgnoreString | 2.5.4.4 |
| 12 | title | caseIgnoreString | 2.5.4.12 |
| 20 | telephoneNumber | telephoneNumber | 2.5.4.20 |

Distinguished Names

For the entry shown in the sample Object Table (Table 3d) two of the attributes, commonName and surname, are distinguished values (or naming values) which combine to form the RDN for the entry. This RDN is stored in the Hierarchy Table.

Multi-valued Attributes

In X.500, it is permissible for an attribute to be multi-valued. The VID column is to distinguish between values for an attribute. In the sample Object Table, the telephoneNumber attribute is multi-valued.

3.1 Mapping Services to SQL 3.1.1 Attribute Types and Values

Any data supplied by an X.500 service is supplied as a list of ObjectId's and their associated values. These must be converted into AID's (using the Attribute table) and normalised values (using the Object table) for use by the X.500 application. The database returns data as AID's and Raw Values, which must then be converted into ObjectId's and their associated values in the X.500 result.

3.1.2 Navigation

Each X.500 service supplies a Distinguished Name which is converted into an EID for use by the X.500 application. When the application processes a service it returns one or more EID's. These EID's can then be translated back into Distinguished Names in the X.500 result.

All X.500 services rely on navigating the directory tree. To navigate to a particular entry, the following procedure is performed:

Given the DN for the entry, locate the entry in the hierarchy table which has an RDN equal to the first RDN in the DN.

Store the EID.

Recursively, locate the entry which has an RDN equal to the next RDN in the DN and a parent equal to the stored EID.

Example

Navigate to the entry "Datacraft/Sales/Network Products/Peter Evans". This will result in a number of select statements, with each returned EID being used as the value of the PARENT in the next statement.

select EID from HIERARCHY
where PARENT=0 and RDN="DATACRAFT"
select EID from HIERARCHY
where PARENT=1 and RDN="SALES"
select EID from HIERARCHY
where PARENT=11 and RDN="NETWORK PRODUCTS"
select EID from HIERARCHY
where PARENT=20 and RDN="PETER EVANS"

3.1.3 Read

Selected attributes to be read can be supplied. Only the values of these attributes (if they are present in the entry) will be returned.

'Types only' can be selected as a read option, in which case no values will be returned. All types present in the entry, or those selected, will be returned.

Navigate to the entry to be read. Store the EID. In the Object Table, read the values of all rows which match the stored EID.

Example

Read the entry "Datacraft/HQ/Network Products" and return all types and values.

Navigate to the entry (as in 3.1.2) and then,
select AID, VALUERAW from OBJECT
where EID=20

3.1.4 Compare

Compare returns a 'matched' or 'not matched' result. A raw value is input but the compare is performed using the normalised value.

Navigate to the required entry. Store the EID. In the Object Table, test for a matching value in all rows which match the stored EID and the specified AID.

Example

Compare the telephone Number "03 727 9256" with the entry "Datacraft/Sales/Network Products/Chris Masters".

Navigate to the entry and then;
select VALUERAW from OBJECT
where EID=30
and AID=20
and VALUENORM="03 727 9456"

If a value is selected then return "matched" else return "not matched".

3.1.5 List

Navigate to the required entry. Store the EID. In the Hierarchy Table, return the RDN's for all rows with a parent matching the stored EID.

Example

List from the entry "Datacraft/Sales".
Navigate to the entry and then;
select NAMERAW from HIERARCHY
where PARENT=11

3.1.6 Add Entry

Navigate to the required parent entry. Store the EID of the parent. Add a new EID to the Hierarchy table and add rows to the Object table for each value in the new entry.

Example

Add a new entry under the entry "Datacraft/Sales/Network Products".

Navigate to the entry and then;
insert into OBJECT
(EID, AID, VID, DISTING, VALUENORM, VALUERAW)
values (33, 3, 1, 1, EDWIN MAHER, Edwin Maher)
and
insert into HIERARCHY
(EID, PARENT, PATH, ALIAS, A-EID, NAMENORM, NAMERAW)
values (33, 20, 1.11.20.33.,0 ,0, EDWIN MAHER, Edwin Maher)

3.1.7 Remove Entry

Navigate to the required entry. Check that the entry is a leaf on the tree, (i.e. check that it has no subordinate entries on the tree). Store the EID. Remove the entry from the Hierarchy table. In the Object Table, remove all rows which match the stored EID.

Example

Remove an entry (with EID=33) under the entry "Datacraft/Sales/Network Products".

Navigate to the entry and then;

delete from OBJECT where EID=33 and delete from HIERARCHY where EID=33

3.1.8 Modify Entry

Navigate to the required entry. Store the EID. In the Object Table, Add, Remove or Modify rows matching the stored EID.

Example

Modify the entry "Datacraft/Sales/Network Products/Alana Morgan".

Add value—title="Branch Manager".

Navigate to the entry and then;

select EID, AID, VID, VALUENORM from OBJECT where EID=31

Test the returned rows for an attribute of title. If none exist, the attribute can be added, otherwise the attribute must be checked to see if it can be multi-valued and whether it already exists.

Insert into OBJECT (EID, AID, VID, DISTING, VALUENORM, VALUERAW)

values (31,12,1,0, BRANCH MANAGER, Branch Manager).

3.1.9 Modify RDN

Navigate to the required entry. Check that the new name (RDN) does not exist in the current level of the subtree (i.e. that the new DN is distinct). Store the EID. Modify the entry in the Hierarchy and Object tables.

Example

Modify the RDN of the entry "Datacraft/Sales/Network Products/Chris Masters" to "Christine Masters".

Navigate to the entry and then;

select EID from HIERARCHY where PARENT=20 and VALUENORM="CHRISTINE MASTERS"

If no entries are returned then the new RDN may be inserted. First set the old RDN to be a non-distinguished value.

update OBJECT set DISTING=0 where EID=30 and VALUENORM="CHRIS"

and update HIERARCHY set NAMENORM="CHRISTINE MASTERS" and set NAMERAW="Christine Masters"

where EID=30 and insert into OBJECT (EID, AID, VID, DISTING, VALUENORM, VALUERAW)

values (30, 3, 1, 1, "CHRISTINE", "Christine")

3.2 Search Strategy

The most powerful and useful X.500 service is the search service. The search service allows an arbitrary complex filter to be applied over a portion of the Directory Information Tree (the search area).

A filter is a combination of one or more filter items connected by the operators AND, OR and NOT. For example; surname="MASTERS" AND title="SALES MANAGER"

The Search area is the part of the tree that is covered by the scope of the search (base-object-only, one-level or whole-subtree).

One technique for resolving searches is to apply the filter and then to see if any matching entries are in the search area. In this case a filter is applied to the entire tree and EID's for all rows matching the filter are returned. Then, for each EID found, step search up through the hierarchy to see if the entry is a subordinate of the base object (i.e. the entry has a parent/grandparent/ . . . that is the base object). If the number of matches is large and the subtree small this is very inefficient. This technique doesn't cope with aliases as an alias is not a parent of the object that it points to and many aliases may point to a single object.

A second strategy is to obtain a list of all EID's in the search area and then apply the filter to these EID's. If an alias is resolved that points outside of the original search area then the subtree pointed to by the alias is expanded and the EID's in that subtree are added to the list. The filter is then applied to the set of expanded EID's. This is very poor if the search area is large.

An innovation is to simultaneously apply the filter over the search area (instead of sequentially as in the two methods described above). This is called single pass resolution. This method is considered to provide considerable performance improvement over the above methods because the rows that are retrieved are those that satisfy both the filter and scope requirements of the search.

When performing a one level search the filter is applied to all entries that have a parent equal to the EID of the base object (for example; search where parent=20 will apply the filter to entries 30, 31 and 32).

When performing a subtree search the path is used to expand the search area. The "path" of each entry is a string of numbers (e.g. "1.10.50.222." which indicates that entry 222 has a parent of 50, a grandparent of 10 and a great grandparent of 1). The path has the unique property that the path of an entry is a prefix of the path of all entries that are subordinate to the entry. That is the path of an entry forms the prefix of the paths of all entries in the subtree below the entry. Therefore when performing a subtree search we obtain the base object of the subtree and then apply the filter to all entries that have a path which is prefixed by the path of the base object (for example; to search for all entries under "Sales" we perform a search where PATH LIKE 1.11.%).

Base Object Search:

Navigate to the base object. Store the EID. In the Object Table, read nominated values from rows which match the stored EID where a filter criteria is satisfied, eg, telephone prefix="727".

Example

Search from the base object "Datacraft/Sales/Network Products" for an entry with surname="MORGAN", using a "base-object-only" search. Navigate to the base object and then;

select AID, VALUERAW from OBJECT where EID=20 and AID=4 and NAMENORM="MORGAN"

One Level Search:

Navigate to the base object. Store the EID. Return the list of EID's which have a parent EID matching the stored EID (in Hierarchy table) and have values which satisfy the filter criteria (OBJECT table). In the Object Table, read nominated values for the returned EID's.

Example

Search from the base object "Datacraft/Sales/Network Products" for an entry with surname="MORGAN", using a "one-level-only" search. Navigate to the base object and then;

select H.EID from HIERARCHY H, OBJECT O
where PARENT=20 and AID=4 and NAMENORM="MORGAN"
and H.EID=O.EID then place the EID's returned into an EIDLIST and
select AID, VALUERAW from OBJECT
where EID in [EIDLIST]

Subtree Search:

Navigate to the base object. Store the EID. Return the list of all EID's with a path like that of the base object (Hierarchy table) and have values which satisfy the filter criteria (OBJECT table). In the Object Table, read nominated values for the returned EID's.

Example

Search from the base object "Datacraft/Sales/Network Products" for an entry with surname="MORGAN", using a "whole-subtree" search. Navigate to the base object and then;

select H.EID from HIERARCHY H, OBJECT O
where PATH like "1.11.20.%" and AID=4
and NAMENORM="MORGAN"
and H.EID=O.EID then place the EID's returned into an EIDLIST and
select AID, VALUERAW from OBJECT
where EID in [EIDLIST]

3.3 Aliases and Navigate

Aliases are resolved during navigation if the "don't-dereference-alias" flag is not set and the service is not an update service (add, delete, modify, modifyRDN).

When an alias is discovered during navigation the alias must be resolved. That is, the object that the alias points to must be obtained. First we check the A_EID column of the Hierarchy table. If the A_EID is 0 then the object that the alias points to must be obtained from the Object table and this object must then be navigated to and the resultant EID stored in the A_EID column. If this is done successfully then the remainder of the path can be navigated. By storing the EID of the aliased object in the A_EID column of the Hierarchy table it is possible to avoid navigating to aliased objects. This can save time, especially if the aliased object is at a low level of the hierarchy.

3.4 Aliases and Search

Aliases are dereferenced during a search if the "search-aliases" flag in the search argument is set. The performance of the search service while dereferencing aliases becomes a two step process. Firstly, define the search area and then apply the filter to the entries within the search area. Aliases dereferenced as part of the search service can expand the search area to which the filter is applied. They also restrict the search area in that any dereferenced aliases are excluded from the search area.

Aliases and OneLevel Search

If aliases are being dereferenced as part of a one level search and an alias entry is found then the alias must be resolved (using the Object table or the A_EID ). The aliased object is then added to the search area to which the filter is applied. In a oneLevel search where aliases are found the search area will consist of non-alias entries directly subordinate to the base object and all dereferenced aliases.

Aliases and Subtree Search

If aliases are being dereferenced as part of a whole subtree search and an alias entry is found then the alias must be resolved (using the Object table or the A_EID) and this EID must then be treated as another base object, unless it is part of an already processed sub tree.

When dereferencing aliases during a search the "Path" column can be used to find alias entries within a subtree join. If an alias entry is found that points outside of the current subtree then the subtree pointed to by the alias can also be searched for aliases. One property of the hierarchical tree structure is that each subtree is uniquely represented by a unique base object (i.e. subtrees do not overlap). When performing a subtree search we build up a list of base objects which define unique subtrees. If no aliases are found then the list will contain only one base object. If an alias is found that points outside of the subtree being processed then we add the aliased object to the list of base objects (unless one or more of the base objects are subordinate to the aliased object in which case the subordinate base object(s) are replaced by the aliased object). The search area will therefore consist of non-alias entries that have a path prefixed by the path of one of the base objects.

4. Logical Design

Whilst the Conceptual Design (see Table 4a) is sufficient to implement the X.500 functionality, further performance improvements can be made.

TABLE 4a

Conceptual Design

Hierarchy Table

| EID | Parent | Path | Alias | A_EID | NameNorm | NameRaw |
|---|---|---|---|---|---|---|

Object Table

| EID | AID | VID | Disting | ValueNorm | ValueRaw |
|---|---|---|---|---|---|

Attribute Table

| AID | Type | Syntax | ObjectId |
|---|---|---|---|

Performance improvements in conventional relational design can be achieved because assumptions can be made about the data—the data is essentially fixed at the time an application is designed. In X.500, none of the data types are known. However performance improvements can still be made because assumptions can be made about the services—these are known at the time the X.500 application is designed.

With reference to FIG. 2B, one innovative approach is to recognise that each table can be organised around the major service relationships (instead of around the major data relationships in conventional relational design). It shall be shown that the above tables can be decomposed into a number of smaller and more efficient tables as shown below.

TABLE 4b

Logical Design

DIT

| EID | PARENT | ALIAS | RDN |
|---|---|---|---|

TABLE 4b-continued

Logical Design

NAME

| EID | RAW |
|-----|-----|

TREE

| EID | PATH | |
|-----|------|--|

ALIAS

| EID | A_EID |
|-----|-------|

TABLE 4b-continued

Logical Design

SEARCH

| EID | AID | VID | DISTING | NORM |
|-----|-----|-----|---------|------|

ENTRY

| EID | AID | VID | RAW |
|-----|-----|-----|-----|

ATTR

| AID | SYNTAX | DESC | OBJECTID |
|-----|--------|------|----------|

4.1 Service Decomposition

The practical reality for most RDBMS's is that big tables with many columns do not perform as well as smaller tables with fewer columns. The major reasons are to do with indexing options, I/O performance and table management (see Sections 4.5 and 4.6). This is why prior art relational design techniques aim to focus primary information into separate tables and derive secondary information via table joins (i.e. normalisation and fragmentation techniques).

One innovation in achieving X.500 performance is to decompose the tables around primary service relationships and derive secondary services via joins. This process is called service decomposition. The following considerations are made:

(1) Columns that have strong relationships are preferred to be kept together (to avoid unnecessary joins);

(2) If the number of significant rows in a given column is independent of the other related columns, then that given column is a candidate for a separate table.

(3) If a column is only used for locating information (input) or only used for returning results (output) then it is a candidate for its own table.

(4) If a column is used as a key for more than one service then it is preferred to be a primary key and therefore in its own table (each table can have only one primary key).

(5) Keys are preferred to be unique or at least strong (non-repetitious).

A first level analysis of column usage is shown in Table 4.1.

TABLE 4.1

| | Basic column usage | | | | | | | | | |
|---|---|---|---|---|---|---|---|---|---|---|
| X.500 Service | Table | EID | AID | VID | Value-Norm | Value-Raw | Parent | Alias | Name-Norm | Name-Raw | Path |
| Navigate | H | R | | | | | S | R | S | | R |
| Read | O | S | (S)/R | R | | R | | | | R | R |
| Compare | O | S | S | | S | | | | | | |
| List | H | | | | | | S | R | | R | |
| Search - filter | O | S/R | S | | (S) | | (S) | | | | (S) |
| Search - result | | S/R | (S)/R | R | | R | | | | R | R |
| Add | H/O | S | | | | | | | | | |
| Remove | H/O | S | | | | | | | | | |
| Modify | O | S | S | S | S | | | | | | |
| Modify RDN | H/O | S | S | S | | | | | S | | |

Key to symbols in the above table:
H—Hierarchy table
O—Object table
S—Supplied value (used in the SQL for Searching the table)
R—Returned value (value retrieved from the tables)
( )—item may or may not be present depending on the options of the service.

From the above information and further analysis, the Conceptual Design tables can be decomposed into a number of smaller tables as described in the following sections.

4.2 Hierarchy Table Decomposition

The Hierarchy table contains the following columns:

TABLE 4.2a

Hierarchy Table

| EID | Parent | Path | Alias | A_EID | NameNorm | NameRaw |
|-----|--------|------|-------|-------|----------|---------|

The Hierarchy Table contains information about objects and their parents, their names, their absolute positions in the hierarchy and if they are aliases. This table can therefore be split into four tables: DIT, NAME, TREE and ALIAS.

The parent information is used for finding a given child or acting on entries that have a given parent. Finding a given child (e.g. Parent=0, NameNorm="DATACRAFT") is the basis for Navigation and update checking (checking for the existence of an object before an Add or ModifyRdn). Acting on entries that have a given parent is used during List or OneLevel Search. Thus the DIT (Directory Information Tree) table has information required for Navigation, but allows its PARENT column to be used by other services.

TABLE 4.2b

DIT Table

| EID | PARENT | ALIAS | RDN |
|---|---|---|---|

An object is differentiated from its siblings via its Relative Distinguished Name (RDN). RDN's are returned for a List (in conjunction with a given Parent) or as part of a full Distinguished Name (Read, Search). Thus the NAME table has information required for returning names (the raw RDN).

TABLE 4.2c

NAME Table

| EID | RAW |
|---|---|

An object's absolute position in the hierarchy is necessary for building DN's (from which the raw RDN's are retrieved) and for expanding subtrees during Search. Thus the TREE table has information about an entry's Path (the sequence of EID's down from the root).

TABLE 4.2d

TREE Table

| EID | PATH |
|---|---|

Alias information is cached so that every time an alias is encountered during Navigate it does not have to be repeatedly resolved. Thus the ALIAS table only contains entries that are aliases. It is also used during OneLevel Search (in conjunction with the DIT Parent column) and Subtree Search (in conjunction with the Path column) to determine if there are any aliases in the search area.

TABLE 4.2e

ALIAS Table

| EID | A_EID |
|---|---|

4.3 Object Table Decomposition

The Object table contains the following columns:

TABLE 4.3a

Object Table

| EID | AID | VID | Disting | ValueNorm | ValueRaw |
|---|---|---|---|---|---|

The Object Table essentially contains information for finding a particular value (e.g. AID=surname, ValueNorm="HARVEY") and for retrieving values (e.g. AID=surname, ValueRaw="Harvey"). This table can therefore be split into two tables: SEARCH and ENTRY.

The Search Table is used to resolve filters in the Search service. It is also used to find values during Compare, Modify and ModifyRDN. The Search table contains one row for each attribute value of each entry. Only the normalised values are stored in this table.

TABLE 4.3b

SEARCH Table

| EID | AID | VID | DISTING | NORM |
|---|---|---|---|---|

The Entry table is used to return values in Reads and Searches. The Entry table contains one row for each attribute value for each entry. The RAW value is the value exactly as initially supplied when the entry was added or modified.

TABLE 4.3c

ENTRY Table

| EID | AID | VID | RAW |
|---|---|---|---|

4.4 Attribute Table

The Attribute table is essentially the same as the Conceptual Design. In practice the "type" field is only descriptive, since any incoming/outgoing X.500 Object Identifier gets converted to/from the internal attribute identifier, AID. Thus this column has been renamed DESC to signify that it is a description field.

TABLE 4.4

ATTR Table

| AID | SYX | DESC | ObjectId |
|---|---|---|---|

4.5 Index Selection

Performance when using SQL is achieved because the RDBMS is able to satisfy the query using a relevant index. This means that every query that has a condition (the "where" clause in SQL) is preferred to have an associated index (otherwise the RDBMS has to resort to a table level scan). However in practical RDMS's:

The number of indexes is restricted;

There may be a high overhead to maintain secondary indexes;

Composite indexes may be required to satisfy any one query. Thus, if performing a query across columns (e.g., type=surname and value="SMITH") then separate indexes on type and value may not result in a fully indexed access. A composite index on both type and value may be required.

One innovation of the table decomposition in the previous sections is to maximise the use of primary indexes across tables. This reduces the number of secondary indexes (i.e. they become primary indexes on their own table). Following is a list of the indexes for each of the six tables used in the logical design.

TABLE 4.5

Table indexes for the Logical Design

| Table | Primary Key | Secondary Index |
|---|---|---|
| DIT | PARENT, RDN | EID |
| NAME | EID | |
| TREE | PATH | EID |
| SEARCH | AID, NORM | EID, AID, VID |
| ENTRY | EID, AID, VID | |
| ATTR | (cached) | |

The table design means that many queries can be handled without joins, giving substantial performance improvement.

The joins that are considered necessary are listed below:

List—for returning the RAW-RDNs under a given object (DIT joined with NAME).

Search/Subtree—for finding EIDs that match a filter over a whole subtree (where the base object is not the root) (TREE joined with SEARCH).

Search/OneLevel—for finding EIDs that match a filter one-level under the base object (DIT joined with SEARCH).

Search/Aliases/Subtree—for finding all the aliases in a subtree (TREE joined with ALIAS).

Search/Aliases/OneLevel—for finding all the aliases under a given object (DIT joined with ALIAS).

Note that the above joins are first level joins (i.e. between only two tables). it is preferable not to use higher order joins.

4.6 Input/Output Performance

An innovation of decomposing tables around services, which increases the number of tables, is that the new tables are much smaller than the unfragmented tables. This can significantly reduce the amount of I/O for the following reasons:

Row Size

By reducing the number of columns in any row, the row width will be shortened. This means that more rows will fit onto a page (where it is assumed that one disk I/O returns one "page" of information). In combination with clustering below, whenever a set of rows need to be retrieved, only one (or a few) page(s) may actually have to be read off the disk (e.g. when reading the attributes of an object, if the ENTRY table is keyed on EID, AID, VID then all the rows relating to that object will be together and will probably be on the same page).

Clustering

Each of the fragmented tables is preferred to have their own (independent) primary key which enables them to cluster data according to how it is used. The primary key may dictate the "storage structure". Thus in the SEARCH table, if the primary key is on AID, NORM (i.e. type, value) then all the data of the same type (e.g. surname) and similar values (e.g. Harvey, Harrison) will be clustered in the same area of the disk. This means that during a Search (e.g. surnames beginning with "HAR") similar data will collected together on the one (or just a few) disk page(s). If the rows are small then the number of disk pages that have to be accessed is significantly reduced.

Caching

Most commercial RDBMS's have the ability to cache pages frequently accessed. Since tables are effectively input (e.g. Navigating using the DIT table), or output (e.g. retrieving information from the ENTRY table) then similar requests (e.g. Searches over the same portion of the Tree) will tend to result in frequently used pages being cached, meaning frequently invoked queries will gain significant benefits. Also the caching is more efficient since pages are "information intensive" as a result of small row size and clustering.

Management

Smaller tables are generally easier to manage: e.g. viewing, creating indexes, collecting statistics, auditing, backups, etc.

5. Logical Methods

This section describes methods of interrogating the Logical Design tables, with reference to FIG. 2B.

Throughout this section, each X.500 method is defined and illustrated with an example. Referring again to FIG. 4, which will be referred to in the following discussion as Table 5a, it can be seen that Table 5a displays a small hierarchy tree which includes an alias reference. The corresponding Table contents are shown in Table 5b.

TABLE 5b

Example Tables

DIT

| BID | PARENT | ALIAS | RDN |
|---|---|---|---|
| 1 | 0 | 0 | DATACRAFT |
| 10 | 1 | 1 | NETWORKS |
| 11 | 1 | 0 | SALES |
| 12 | 1 | 0 | MARKETING |
| 20 | 11 | 0 | NETWORK PRODUCTS |
| 30 | 20 | 0 | CHRIS MASTERS |
| 31 | 20 | 0 | ALANA MORGAN |
| 32 | 20 | 0 | PETER EVANS |

NAME

| BID | RAW |
|---|---|
| 1 | [Datacraft] |
| 10 | [Networks] |
| 11 | [Sales] |
| 12 | [Marketing] |
| 20 | [Network Products] |
| 30 | [Chris Masters] |
| 31 | [Alarm Morgan] |
| 32 | [Peter Evans] |

TREE

| EID | PATH |
|---|---|
| 1 | 1. |
| 10 | 1.10. |
| 11 | 1.11. |
| 12 | 1.12. |
| 20 | 1.11.20. |
| 30 | 1.11.20.30. |
| 31 | 1.11.20.31. |
| 32 | 1.11.20.32. |

ALIAS

| EID | A-EID |
|---|---|
| 10 | 20 |

ATTRIBUTE

| AID | SYX | DESC | OBJECTID |
|---|---|---|---|
| 0 | objectIdentifierSyntax | objectClass | 2.5.4.0 |
| 1 | distinguishedNameSyntax | aliasedObjectName | 2.5.4.1 |
| 3 | caseIgnoreStringSyntax | commonName | 2.5.4.3 |
| 4 | caseIgnoreStringSyntax | surname | 2.5.4.4 |
| 7 | caseIgnoreStringSyntax | localityName | 2.5.4.7 |
| 8 | caseIgnoreStringSyntax | stateOrProvinceName | 2.5.4.8 |
| 9 | caseIgnoreStringSyntax | streetAddress | 2.5.4.9 |

TABLE 5b-continued

Example Tables

| | | | | |
|---|---|---|---|---|
| 10 | caseIgnoreStringSyntax | organization-Name | 2.5.4.10 | |
| 11 | caseIgnoreStringSyntax | organizational-UnitName | 2.5.4.11 | |
| 12 | caseIgnoreStringSyntax | title | 2.5.4.12 | |
| 13 | caseIgnoreStringSyntax | description | 2.5.4.13 | |
| 16 | PostalAddress | postalAddress | 2.5.4.16 | |
| 17 | caseIgnoreStringSyntax | postalCode | 2.5.4.17 | |
| 18 | caseIgnoreStringSyntax | postOfficeBox | 2.5.4.18 | |
| 20 | telephoneNumberSyntax | telephoneNumber | 2.5.4.20 | |

SEARCH

| EID | AID | VID | DISTING | NORM |
|---|---|---|---|---|
| 1 | 0 | 0 | 0 | 2.5.6.4 |
| 1 | 10 | 0 | 1 | DATACRAFT |
| 1 | 16 | 0 | 0 | 266–268 MAROONDAH HIGHWAY |
| 1 | 17 | 0 | 0 | 3138 |
| 10 | 0 | 0 | 0 | 2.5.6.1 |
| 10 | 1 | 0 | 1 | DATACRAFT/SALES/NETWORK PRODUCTS |
| 11 | 0 | 0 | 0 | 2.5.6.5 |
| 11 | 11 | 0 | 1 | SALES |
| 11 | 13 | 0 | 0 | SALES DEPARTMENT |
| 12 | 0 | 0 | 0 | 2.5.6.5 |
| 12 | 11 | 0 | 1 | MARKETING |
| 12 | 13 | 0 | 0 | MARKETING DEPARTMENT |
| 20 | 0 | 0 | 0 | 2.5.6.5 |
| 20 | 11 | 0 | 1 | NETWORK PRODUCTS |
| 20 | 13 | 0 | 0 | NETWORK PRODUCTS SECTION |
| 30 | 0 | 0 | 0 | 2.5.6.7 |
| 30 | 3 | 0 | 1 | CHRIS |
| 30 | 4 | 0 | 1 | MASTERS |
| 30 | 12 | 0 | 0 | SALES MANAGER |
| 30 | 20 | 0 | 0 | 03 727 9456 |
| 30 | 20 | 1 | 0 | 018 042 671 |
| 31 | 0 | 0 | 0 | 2.5.6.7 |
| 31 | 3 | 0 | 1 | ALANA |
| 31 | 4 | 0 | 1 | MORGAN |
| 31 | 12 | 0 | 0 | SALES SUPPORT |
| 31 | 20 | 0 | 0 | 03 727 9455 |
| 32 | 0 | 0 | 0 | 2.5.6.7 |
| 32 | 3 | 0 | 1 | PETER |
| 32 | 4 | 0 | 1 | EVANS |
| 32 | 12 | 0 | 0 | SALESPERSON |
| 32 | 20 | 0 | 0 | 03 727 9454 |

ENTRY

| BID | AID | VID | RAW |
|---|---|---|---|
| 1 | 0 | 0 | [2.5.6.4] |
| 1 | 10 | 0 | [Datacraft] |
| 1 | 16 | 0 | [266–268 Maroondah Highway] |
| 1 | 17 | 0 | [3138] |
| 10 | 0 | 0 | [2.5.6.1] |
| 10 | 1 | 0 | [Datacraft/Sales/Network Products] |
| 11 | 0 | 0 | [2.5.6.5] |
| 11 | 11 | 0 | [Sales] |
| 11 | 13 | 0 | [Sales Department] |
| 12 | 0 | 0 | [2.5.6.5] |
| 12 | 11 | 0 | [Marketing] |
| 12 | 13 | 0 | [Marketing Department] |
| 20 | 0 | 0 | [2.5.6.5] |
| 20 | 11 | 0 | [Network Products] |
| 20 | 13 | 0 | [Network Products Section] |
| 30 | 0 | 0 | [2.5.6.7] |
| 30 | 3 | 0 | [Chris] |
| 30 | 4 | 0 | [Masters] |
| 30 | 12 | 0 | [Sales Manager] |
| 30 | 20 | 0 | [(03) 727-9456] |
| 30 | 20 | 1 | [(018) - 042 671] |
| 31 | 0 | 0 | [2.5.6.7] |
| 31 | 3 | 0 | [Alana] |
| 31 | 4 | 0 | [Morgan] |
| 31 | 12 | 0 | [Sales Support] |
| 31 | 20 | 0 | [(03) 727-9455] |
| 32 | 0 | 0 | [2.5.6.7] |
| 32 | 3 | 0 | [Peter] |
| 32 | 4 | 0 | [Evans] |
| 32 | 12 | 0 | [Salesperson] |
| 32 | 20 | 0 | [(03) 727-9454] |

NOTE:
[ . . . ] indicates a binary encoding of the exact data entry value.

5.1 Common Services

Tree Navigation

All X.500 services rely on navigating the directory tree, illustrated in FIG. 3. The purpose of tree navigation is to retrieve the EID of the entry corresponding to the supplied Distinguished Name. Navigation begins from the root of the tree and continues down the tree until all the RDN's in a DN have been resolved (verified). This process is known as a "Tree Walk".

The DIT Table is the primary table used for tree navigation. Referring to the example hierarchy tree, illustrated as table 5a in FIG. 3, resolution of the DN "Datacraft/Sales/Network Products/Peter Evans" involves the following processes:

Scan the DIT table for a row containing PARENT=0 and RDN="DATACRAFT". The EID for this row is 1.

Scan the DIT table for a row containing PARENT=1 and RDN="SALES". The EID for this row is 11.

Scan the DIT table for a row containing PARENT=11 and RDN="NETWORK PRODUCTS". The EID for this row is 20.

Scan the DIT table for a row containing PARENT=20 and RDN="PETER EVANS". The EID for this row is 32.

The DN has now been resolved and any values relating to the object can be obtained from the Entry Table using the key EID=32.

Aliases

Sometimes a DN can contain an alias, which is effectively another DN. Aliases complicate the tree walk process because the tree walk cannot continue until the alias is resolved. This requires a separate tree walk for the alias.

As an example, consider the DN "Datacraft/Networks/Peter Evans". The first two steps in resolving this DN would be:

Scan the DIT table for a row containing PARENT=0 and RDN="DATACRAFT". The EID for this row is 1.

Scan the DIT table for a row containing PARENT=1 and RDN="Networks"

The EID for this row is 10.

At this stage we discover that this entry is an alias. The Alias Table is checked to see if the EID of the alias has been cached. If this is the first time an attempt has been made to resolve this alias then the A_EID column in the Alias Table will be zero. For the purpose of discussion it will be assumed that this is the first time.

To resolve the alias, the DN of the aliased object must be determined. This is stored in the "aliasedObjectName" attribute of the alias entry. The aliasedObjectName has an AID=1 (from the ATTR table) and so the DN is obtained from the Entry Table (RAW value) where EID=10 and AID=1.

In this example, the DN of the alias is "Datacraft/Sales/Network Products". This DN is resolved completely using the normal tree walking technique. The value of EID is 20.

At this stage, navigation continues for the unresolved RDN's in the original DN, namely "PETER EVANS". The last step required is then:

Scan the DIT table for a row containing PARENT=20 and RDN="PETER EVANS".

Once an alias has been resolved it can be added (cached) in the Alias Table. This table contains a reference, A_EID, to the aliased object. In the above example, an entry in the Alias Table with an EID of 10 would have an A_EID of 20. Once an alias has been cached a tree walk is no longer necessary to resolve the alias.

Directory Paths

When objects are added to the DIT table, a corresponding row is added to another table called the Tree Table. This table stores the list of the EID's which identify a "Path" to the object.

Distinguished Names

Most services require the distinguished name to be returned in the Service Result. Using the directory path from the Tree Table, a DN can be constructed from the RAW RDN values stored in the Name Table.

Entry Information Selection

Many of the X.500 Services are requested with an argument called "EntryInformationSelection" or EIS. The EIS argument is used to indicate what information in the Entry should be returned. Basically, EIS can be optionally;

no information
attributes and values for selected or all attributes
values only for selected or all attributes
Entry Information Entry Information is a return parameter for Read and Search. It always contains the Distinguished Names of selected entries and, optionally, attributes and/or values as specified in the EIS argument of the request.

Common Arguments

All of the X.500 Services pass a set of common arguments in the Service Request. Common Arguments contain information such as service controls (time limit and size limit), the DN of the requestor of the service and security information.

Common Results

Some X.500 Services pass a set of common results in the Service Response. Common Results contain information such as security parameters, the DN of the performer of the service and an alias dereferenced flag.

5.2 Read Service

A Read operation is used to extract information from an explicitly identified entry.

| X.500 definition | |
|---|---|
| Argument | Description |
| Name | A Distinguished Name |
| EntryInformationSelection | The attributes and values to be returned (ie EIS) |
| Common Arguments | |
| Result | Description |
| Entry Information | The DN plus any attributes and values returned |
| Common Results | |

Method

Perform a tree walk using the DIT table, resolving aliases if necessary. Obtain the base EID.

Using PATH from the Tree Table and the RAW RDN's from the Name Table, build a DN.

If EIS specifies no attributes or values, just return the DN.

If EIS specifies ALL types and values, return the RAW values from the Entry Table for the matching EID.

If EIS specifies selected types and values, obtain the AID's from the Attribute Table and then return selected types and/or values for the matching EID Example:

Read the entry "Datacraft/Sales/Network Products/Peter Evans".

EIS is set to: attribute Types=allAttributes, InfoTypes=attributeTypesAndValues.

Using the DIT table perform a Tree Walk traversing EID's 1, 11, 20 and 32 for the normalised RDN's DATACRAFT, SALES, NETWORK PRODUCTS, PETER EVANS. The EID of the selected object is 32.

Extract the PATH from the Tree Table for EID=32. The PATH is 1.11.20.32.

Build aDN from the RAW values in the Name Table for EID's 1, 11, 20, 32.

Using the Entry Table and the Attribute Table, for each matching EID;

return the OBJECTID's from the Attribute Table and the ASN.1 encoded RAW values from the Entry Table

| | |
|---|---|
| 2.5.4.0 | [2.5.6.7] |
| 2.5.4.3 | [PETER] |
| 2.5.4.4 | [EVANS] |
| 2.5.4.9 | [SALESPERSON] |
| 2.5.4.20 | [(03) 727-9454] | return the DN 5.3 Compare Service

A Compare operation is used to compare a value (which is supplied as an argument of the request) with the value(s) of / particular attribute type in a particular object entry.

| X.500 DEFINITION | |
|---|---|
| Argument | Description |
| Name | A Distinguished Name |
| AttributeValueAssertion | The attribute type and value to be compared |
| Common Arguments | |
| Result | Description |
| DistinguishedName | The DN of the selected object (returned if an alias is dereferenced) |
| matched | TRUE/FALSE result of compare |
| fromEntry | N/A |
| Common Results | |

Method

Perform a tree walk using the DIT table, resolving aliases if necessary. Obtain the EID of the base object.

From the Attribute Table, obtain the AID of the attribute to be compared.

From the Entry Table, select the row(s) matching the EID and AID.

Compare the value.

Return TRUE or FALSE as the Compare result.

If an alias is dereferenced, return the DN of the selected object, using the path from the Tree Table and the RAW RDN's from the Name Table.

Example

Compare the DN "Datacraft/Sales/Network Products/Peter Evans" with a purported AttributeValueAssertion of "title=[Salesperson]".

Obtain the EID for the given DN using a TreeWalk. The EID of the selected object is 32.

Using the Attribute table, obtain the AID for "title", ie AID=12.

Using the Search Table locate rows with EID=32 and AID=12 and test for "NORM=SALESPERSON".

Return TRUE or FALSE depending on the outcome of this test. In this instance the result would be TRUE.

Since no aliases were dereferenced, the DN of the entry is not returned.

5.4 List Service

A list operation is used to obtain a list of immediate subordinates of an explicitly identified entry.

| X.500 DEFINITION | |
| --- | --- |
| Argument | Description |
| Name | A Distinguished Name |
| Common Arguments | |
| Result | Description |
| DistinguishedName | The DN of the selected object (returned if an alias is dereferenced) |
| subordinates | A list of RDN's for the subordinate entries (aliases, indicated by an alias flag, are not dereferenced) |
| partialOutcomeQualifier | An indication that an incomplete result was returned, eg, a time limit or size limit restriction. |
| Common Results | |

Method

Perform a tree walk using the DIT table, resolving aliases if necessary. Obtain the EID of the base object.

Using the DIT and Name Tables return the ALIAS flag and the RAW RDN PARENT is equal to the EID of the base object.

Example

Perform a list for the DN "Datacraft".

Obtain the EID for the DN using a TreeWalk. The EID of the selected object is "1".

For each EID with a PARENT=1 return the RAW RDN from the Name Table, ie, [Networks], [Sales], [Marketing]

return the alias flags, ie, TRUE, FALSE, FALSE.

As no alias was dereferenced in the tree walk, the DN of the selected object is not returned. Note also that the alias entry [Networks] is not dereferenced.

5.5 Search Service

The Search Service is the most complex of all X.500 services. Search arguments indicate where to start the search (baseObject), the scope of the search (subset), the conditions to apply (filter) and what information should be returned (selection). In addition, a flag is passed to indicate whether aliases should be dereferenced (searchAliases).

The possible values for subset are baseObject, oneLevel and wholeSubtree. Base object indicates that the search filter will only be applied to attributes and values within the base object. OneLevel indicates the Search filter will be applied to the immediate subordinates of the base object. Whole subtree indicates the Search filter will be applied to the base object and all of its subordinates.

A simple example of a filter condition would be: surname="EVANS" or telephoneNumber PRESENT.

| X.500 DEFINITION | |
| --- | --- |
| Argument | Description |
| baseObject | The Distinguished Name of the baseObject |
| subset | baseObject, oneLevel or wholeSubtree |
| filter | search conditions |
| searchAliases | a flag to indicate whether aliases among subordinates of the base object should be dereferenced during the search. |
| selection | EIS as for READ. The attributes and values to be returned. |
| Common Arguments | |
| Result | Description |
| DistinguishedName | The DN of the selected object (returned if an alias is dereferenced) |
| entries | Attributes & values (as defined in selection) for the entries which satisfy the filter. |
| partialOutcomeQualifier | An indication that an incomplete result was returned, eg, a time limit or size limit restriction. |
| Common Results | |

The search procedures for each search scope are outlined as follows:

Base Object

Perform a tree walk using the DIT table, resolving aliases if necessary. Obtain the EID of the base object.

Apply the filter to attributes and values in the Search Table with the EID of the selected object.

If the filter condition is matched, return the Entry Information from the Entry Table.

If an alias is dereferenced, return the DN using the Tree Table to extract the PATH and the Name Table to build the DN.

One Level

Perform a tree walk using the DIT table, resolving aliases if necessary. Obtain the EID of the base object.

Check to see if any aliases exist with PARENT=EID and if so resolve them to obtain an aliases dereferenced list.

Using the Search and DIT Tables, apply the filter (attribute/value conditions) and the scope (PARENT=EID of selected object and any aliases dereferenced). A list of matching EID's will be returned.

If an alias is dereferenced, return the DN using the Tree Table to extract the PATH and the Name Table to build the DN.

For each matching EID:

Return the Entry Information obtained from the Search Table using the Entry Table (as per Read Service).

Whole Subtree

Perform a tree walk using the DIT table, resolving aliases if necessary. Obtain the EID of the base object.

Check to see if any aliases exist with PATH prefix matching the PATH of the selected object.

For each alias discovered, check to see if the alias points outside the current subtree and if it does repeat the previous step. Once all aliases have been resolved, a set of unique base objects will have been found (with no overlapping areas).

Using the Search and Tree Tables, apply the filter (attribute/value conditions) and the scope (PATH LIKE PATH prefix of the selected object) to each unique base object. A list of matching EID's will be returned.

If an alias is dereferenced during Navigation (not during searching), return the DN using the Tree Table to extract the PATH and the Name Table to build the DN.

For each matching EID:

Return the Entry Information obtained from the Search Table using the Entry Table (as per Read Service).

Example

Perform a search on the baseObject "Datacraft/Sales" with:

Scope set to WholeSubtree a Filter of "surname, substring initial=M". (Look for all surnames beginning with "M")

SearchAliases set to TRUE.

EIS set to attribute Types=allAttributes, InfoTypes=attributeTypesAndValues.

Method

Obtain the EID for the base object DN using a TreeWalk. The EID of the base object is "11".

From the Tree Table, obtain the PATH for EID=11, ie, "1.11.".

Check for any aliases among entries that have a path beginning with "1.11.". There are no aliases in this case.

Obtain the AID for the attribute "surname" in the Attribute Table, ie, 4.

Apply the filter and scope simultaneously. i.e. Using the Search Table, obtain a list of EID's from the target list where AID=4 and the value begins with "M" joined with the Tree Table who's PATH is LIKE '1.11.%'. The matching EID's are 30 and 31.

Using the Entry Table and the Attribute Table, for each matching EID:

return the OBJECTID's from the Attribute Table and the ASN.1 encoded RAW values from the Entry Table i.e.,

|  |  |
|---|---|
| 2.5.4.0, | [2.5.6.7], |
| 2.5.4.3, | [Chris], |
| 2.5.4.4 | [Masters] |
| 2.5.4.9 | [Sales Manager] |
| 2.5.4.20 | [(03) 727-9456] |
| 2.5.4.20 | [(018) - 042 671] |
| 2.5.4.0 | [2.5.6.7] |
| 2.5.4.3 | [Alana] |
| 2.5.4.4 | [Morgan] |
| 2.5.4.9 | [Sales Support] |
| 2.5.4.20 | [(03) 727-9454] |

5.6 Add Entry Service

An AddEntry operation is used to add a leaf entry either an object entry or an alias entry) to the Directory Information Tree.

| X.500 DEFINITION | |
|---|---|
| Argument | Description |
| object | The Distinguished Name of the entry to be added |
| entry | A set of attributes to add |
| Common Arguments | |
| Result | Description |
| NULL | NULL |

Method

Using the DIT table, tree walk to the parent of the entry to be added (Parent EID).

Using the DIT table, check if the entry exists (check for RDN=new RDN and PARENT=Parent EID).

If the entry does not exist, allocate a new EID and add the entry. Insert into the DIT Table, the Name Table, the Tree Table, the Search Table, the Entry Table and, if it is an alias entry, the Alias Table.

Example

Under the object with a DN of "Datacraft/Marketing" add an object with the following attributes and values.

|  |  |
|---|---|
| surname | [Delahunty] |
| commonName | [Mary] |
| title | [Marketing Manager] |
| telephoneNumber | [(03) 727-9523] |

Obtain the EID for the base object DN using a TreeWalk. The EID of the base object is "12".

Using the DIT Table, look for a duplicate entry, ie, PARENT=12 and RDN="MARY DELAHUNTY". No duplicates exist.

Add the following rows to the Tables shown.

| DIT | | | |
|---|---|---|---|
| EID | PARENT | ALIAS | RDN |
| 33 | 11 | 0 | MARY DELAHUNTY |

| NAME | |
|---|---|
| EID | RAW |
| 33 | [Mary Delahunty] |

| TREE | |
|---|---|
| EID | PATH |
| 33 | 1.12.21. |

| SEARCH | | | | |
|---|---|---|---|---|
| EID | AID | VID | DISTING | NORM |
| 33 | 0 | 0 | 0 | 2.5.6.7 |
| 33 | 3 | 0 | 1 | DELAHUNTY |
| 33 | 4 | 0 | 1 | MARY |
| 33 | 12 | 0 | 0 | MARKETING MANAGER |
| 33 | 20 | 0 | 0 | 03 727 9523 |

| ENTRY | | | |
|---|---|---|---|
| EID | AID | VID | RAW |
| 33 | 0 | 0 | [2.5.6.7] |
| 33 | 3 | 0 | [Delahunty] |
| 33 | 4 | 0 | [Mary] |
| 33 | 12 | 0 | [Marketing Manager] |
| 33 | 20 | 0 | [(03) 727-9523] |

5.7 Remove Entry Service

A RemoveEntry operation is used to remove a leaf entry (either an object entry or entry) from the Directory Information Tree.

| X.500 DEFINITION | |
|---|---|
| Argument | Description |
| object | The Distinguished Name of the entry to be deleted |
| Common Arguments | |
| Result | Description |
| NULL | NULL |

Method

Perform a tree walk using the DIT table. Obtain the EID of the base object.

If the entry exists, and it is a leaf entry, then for the condition EID=EID of the selected object, delete from the DIT Table, the Name Table, the Tree Table, the Search Table, the Entry Table and, if it is an alias entry, the Alias Table.

Example

Delete the object with a DN of "Datacraft/Marketing/Mary Delahunty"

Method

Obtain the EID for the base object DN using a TreeWalk. The EID of the base object is "21". Check that no entries have PARENT=21.

Delete all rows added to the DIT Table, the Name Table, the Tree Table, the Search Table and the Entry Table (refer to Add Entry example) where EID=21.

5.8 Modify Entry Service

The ModifyEntry operation is used to perform a series of one or more of the following modifications to a single entry:
add a new attribute
remove an attribute
add attribute values
remove attribute values
replace attribute values
modify an alias

| X.500 DEFINITION | |
|---|---|
| Argument | Description |
| object | The Distinguished Name of the entry to be modified |
| changes | A list of modifications |
| Common Arguments | |
| Result | Description |
| NULL | NULL |

Method

Perform a tree walk using the DIT table. Obtain the EID of the selected object.

For the selected object, perform one or more of the following actions: Add Value, Delete Value, Add Attribute, Delete Attribute The operations required for each action are as follows:

Add Value

If the attribute exists, add the value to the Entry Table and the Search Table. Checks are: If the attribute is single valued test for an existing value; if the attribute is multi-valued check for a duplicate value.

Delete Value

For the Entry Table and the Search Table, if the value exists, delete it. A Distinguished Value cannot be deleted.

Add Attribute

If the attribute does not exist, add the Attribute Values to the Entry Table and the Search Table.

Delete Attribute

For the Entry Table and the Search Table, if the attribute exists, delete it. Delete all values with AID=attr and EID=base object. Naming attributes cannot be deleted.

Example

Modify the Entry "Datacraft/Sales/Network Products/Chris Masters" with the following changes:

| Delete Attribute and Value | telephoneNumber | 018-042 671 |
|---|---|---|
| Modify Attribute and Value | title | Sales Assistant |

The search and Entry Tables reflect the changes.

| SEARCH | | | | |
|---|---|---|---|---|
| EID | AID | VID | DISTING | NORM |
| 30 | 0 | 0 | 0 | 2.5.6.7 |
| 30 | 3 | 0 | 1 | CHRIS |
| 30 | 4 | 0 | 1 | MASTERS |
| 30 | 12 | 0 | 0 | SALES ASSISTANT |
| 30 | 20 | 0 | 0 | 03 727 9456 |

| ENTRY | | | |
|---|---|---|---|
| EID | AID | VID | RAW |
| 30 | 0 | 0 | [2.5.6.7] |
| 30 | 3 | 0 | [Chris] |
| 30 | 4 | 0 | [Masters] |
| 30 | 12 | 0 | [Sales Assistant] |
| 30 | 20 | 0 | [(03) 727-9456] |

5.9 Modify RDN Service

The ModifyRDN operation is used to change the Relative Distinguished Name of a leaf entry (either an object entry or an alias entry) from the Directory Information Tree.

| Argument | Description |
|---|---|
| object | The Distinguished Name of the entry to be modified |
| newRDN | The new RDN of the entry |
| deleteOldRDN | flag-delete all values in the old RDN not in new RDN |
| Common Arguments | |
| Result | Description |
| NULL | NULL |

Method

Perform a tree walk using the DIT table. Obtain the EID and Parent EID of the base object.

Using the DIT table, check for equivalent entries and return error if one is found. An equivalent entry has RDN=new RDN and PARENT=Parent EID.

Using the Name Table, replace the old RDN with the new RDN.

Using the DIT Table, replace the old RDN with the new RDN.

Using the Entry Table, insert the new value.

Using the Search Table, locate value=old RDN and set DISTING to 0. Insert the new value.

If deleteOldRDN is set to TRUE the procedures following the Tree Walk are as follows:

Using the DIT table, check for a sibling with the same name and an EID not equal to the base EID Using the Name Table, replace the old RDN with the new RDN.

Using the DIT Table, replace the old RDN with the new RDN.

Using the Entry Table, delete the old value(s) and insert the new value(s).

Using the Search Table, delete the old value(s) and insert the new value(s).

Example

Modify the RDN of "Datacraft/Sales/Network Products/Chris Masters". The new RDN is "Christine Masters".

deleteOldRDN is set to FALSE.

The changes to the Tables will be as follows:

| DIT | | | |
|---|---|---|---|
| EID | PARENT | ALIAS | RDN |
| 21 | 11 | 0 | CHRISTINE MASTERS |

| NAME | |
|---|---|
| EID | RAW |
| 21 | [Christine Masters] |

| SEARCH | | | | |
|---|---|---|---|---|
| EID | AID | VID | DISTING | NORM |
| 30 | 0 | 0 | 0 | 2.5.6.7 |
| 30 | 3 | 0 | 1 | CHRISTINE |
| 30 | 3 | 1 | 0 | CHRIS |
| 30 | 4 | 0 | 1 | MASTERS |
| 30 | 12 | 0 | 0 | SALES ASSISTANT |
| 30 | 20 | 0 | 0 | 03 727 9456 |

| ENTRY | | | |
|---|---|---|---|
| EID | AID | VID | RAW |
| 30 | 0 | 0 | [2.5.6.]1 |
| 30 | 3 | 0 | [Christine] |
| 30 | 3 | 1 | [Chris] |
| 30 | 4 | 0 | [Masters] |
| 30 | 12 | 0 | [Sales Assistant] |
| 30 | 20 | 0 | [(03) 727-9456] |

5.10 Complications

If error, limit or abandon occurs during processing of any of the services, then the processing is discontinued and an appropriate error message returned.

Errors

Each X.500 service consists of 3 parts; ARGUMENT, RESULT and ERRORS. In the above descriptions of the services, ARGUMENT and RESULT have been included in the X.500 definitions. Error conditions, however, are many and varied and no attempt is made to describe them in this document. The National Institute of Standards and Technology (NIST) document "Stable Implementation Agreements for Open Systems Interconnection Protocols: Version 3" provides a full coverage of errors for the X.500 standard.

Time Limit & Size Limit

Time Limit and Size Limit form part of Service Controls. They can be optionally set to some finite limit and included in the Common Arguments.

Time Limit indicates the maximum elapsed time, in seconds, within which the service shall be provided. Size Limit (only applicable to List and Search) indicates the maximum number of objects to be returned. If either limit is reached an error is reported. For a limit reached on a List or a Search, the result is an arbitrary selection of the accumulated results.

Abandon

Operations that interrogate the Directory, ie Read, Compare, List and Search, may be abandoned using the Abandon operation if the user is no longer interested in the results.

Aliases & Search

If an alias is encountered in a search and that alias points to a separate branch of the directory tree, then dereferencing of the alias requires:

Navigation from the root entry to the referenced entry

Searching of all items subordinate to the referenced entry

Figure 5:
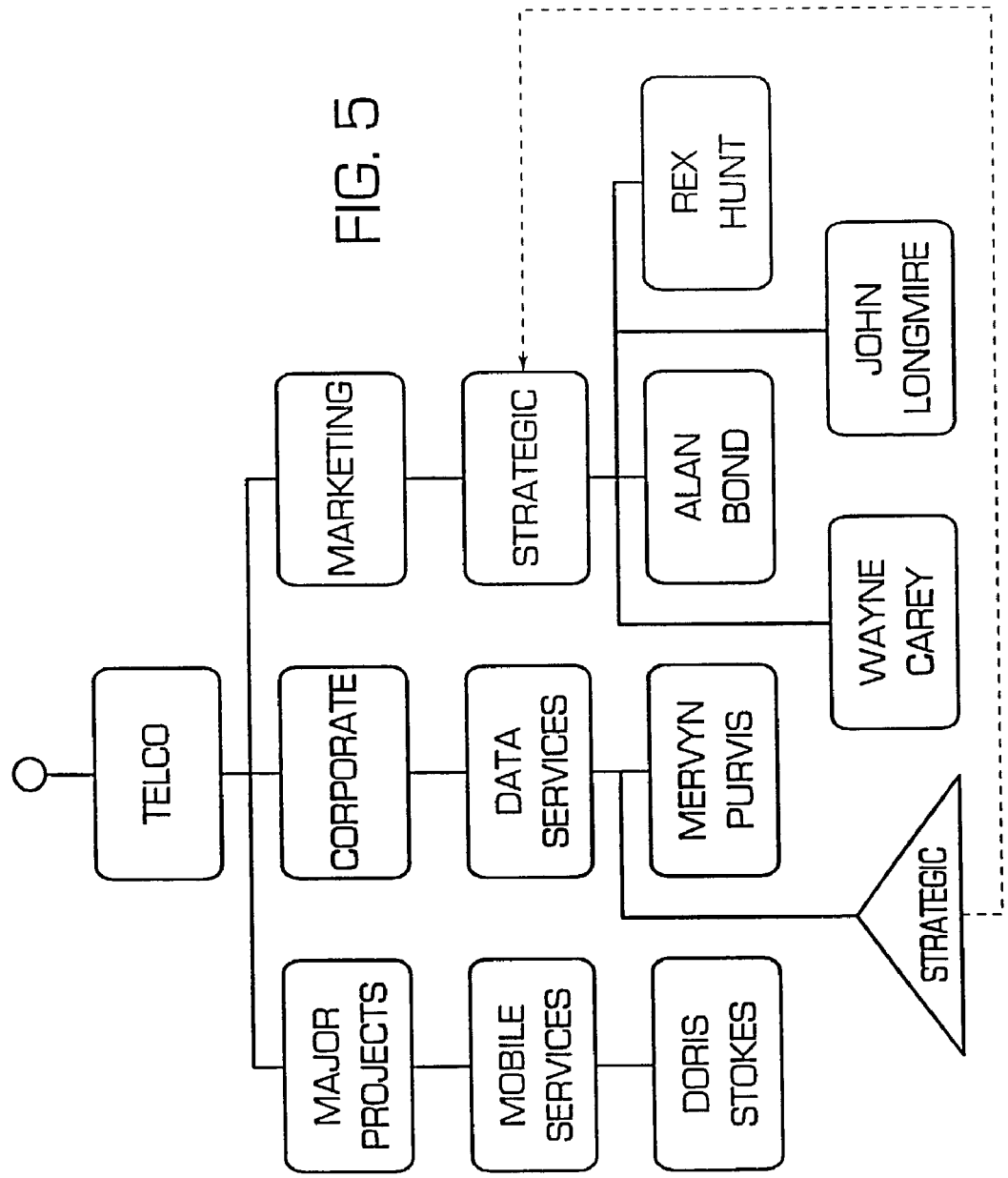
FIG. 5 is an illustration of a hierarchy within a hypothetical organization, arranged as a tree, that has an alias referencing a different branch of the tree, according to the present invention.

In the example shown in FIG. 5, if a WholeSubtree Search was performed on a base object of "Telco/Corporate/Data Services" the entries "Mervyn Purvis" and the alias "Strategic" would be searched. Strategic, however, points to a different branch of the tree which requires searching of the entry "Strategic" and all of its subordinates, ie, "Alan Bond", "Rex Hunt", "Wayne Carey" and "John Longmire".

5.11 Implementation Optimisations

The Logical methods include a number of optimisations that enhance performance. These methods are outlined below.

Caching

The Attribute table can be cached. This means that (apart from initial loading of the attributes) no SQL statements need to be issued to the database when decoding or encoding the attributes. In the present X.500 system attribute conversions are performed in memory. This provides a substantial speed advantage.

Validation

Query validation is performed in memory where possible. This avoids database rollbacks which are time and system consuming. For example when adding an entry each attribute is validated before any attempt is made to add the entry. If an error is found then no SQL calls need to be issued.

Optimise Query Handling

As the format of most services is known, many instances of these services can be resolved using static SQL statements. More complex services, such as searches with complex filters, can be resolved using dynamic SQL. This enables arbitrarily complex searches to be performed.

Parallel Queries

Also when processing search results the present system utilises set orientation queries of SQL to avoid 'row at a time' processing. Thus search results may be assembled in parallel in memory.

Data Storage

The tables that store raw data store the data in ASN.1 format. This provides an efficient means of transferring data into or out of the database.

Database Techniques

Complex services can be further improved by using the query optimiser, which provides a mechanism for reducing the time spent in resolving the query. The use of a relational database also provides an efficient use of memory and enables large databases to be constructed without the need for large amounts of memory being available. Many other X.500 applications cache the entire database in memory to achieve performance. This method consumes large amounts of memory and is not scalable.

6. Physical Design

The physical design results from a process called physical transformation of the logical design. The physical design represents a preferred realisation or embodiment of the logical design. FIG. 2B and the tables below show one form of the physical design. New columns and tables are highlighted by double borders.

TABLE 6

Physical Design

DIT

| EID | PARENT | RDNKEY | RDN | FLAGS |

NAME

| EID | RAW | FLAGS |

TREE

| EID | LEV1 | LEV2 | LEV3 | LEV3 | PATH | FLAGS |

INFO

| MAXEID | FLAGS |

ALIAS

| EID | A_EID | FLAGS |

SEARCH

| EID | AID | VID | NORMKEY | NORM | FLAGS |

ENTRY

| EID | AID | VID | RAW | FLAGS |

BLOB

| EID | AID | VID | VFRAG | RAW | FLAGS |

ATTR

| AID | SYNTAX | DESC | OBJECTID | FLAGS |

SENTRY

| EID | AID | DESC | VALUE | FLAGS |

OCLASS

| OCID | DESC | OBJECTID | MUST LIST | MAY LIST | SUPERLIST | FLAGS |

The reasons for the above changes are described below.

6.1 Efficiency

INFO Table

This table holds the highest EID value that has been used in the database. The inclusion of the INFO table enables the next EID to be obtained without any calculation of the maximum EID being performed by the database. This provides improved efficiency in adding entries to the database. More importantly the inclusion of the INFO table removes contention problems which may occur when multiple DSA's are adding entries at the same time.

Shadow Keys

Three tables have had shadow keys added. These are:
a) The NORMKEY column in the SEARCH table.
b) The RDNKEY column in the DIT table.
c) The LEV1, LEV2, LEV3 and LEV4 columns in the TREE table.

Each of these shadow key columns is a shortened version of a larger column. They have been added to shorten the indexes on each table. This gives improved performance for any queries that use the indexes and it also improves disk space usage as small indexes take up less space than large indexes.

The shadow keys in the PATH table utilise the structured nature of the PATH. By being a composite key then exact matching can be used in the SQL instead of the "LIKE" operator.

e.g. WHERE LEV1=1 AND LEV2=10 AND . . .
instead of WHERE PATH LIKE '1.10.%'.

If each of the LEV columns has their own index, then a sub-tree search needs to only use the base object. e.g. LEV2=10, since all objects under entry 10 will have LEV2=10.

SENTRY Table

Some types of attribute values do not need to be normalised e.g. integer, boolean, date. Instead of storing them twice (SEARCH.NORM and ENTRY.RAW) they can be stored just once in a hybrid table called the SENTRY table. This reduces table sizes and increases storage efficiency at the cost of having to search two tables and retrieve from two tables.

OCLASS Table

Most attributes have a wide variation in their values e.g. surnames could range from AALDERS to ZYLA with a great many different values in between. However, Object Classes (whose values are ObjectIdentifiers or OIDs) have very few values e.g. in an organisation of 10,000 people, the only object classes in the directory may be for organisation, organisationalUnit and organisationalPerson (of which many may be the latter). The OCLASS table gives a numeric descriptor to an object class called an OCID. The OCID can then be stored in the SENTRY table and a mapping done whenever an Object Class is searched or retrieved. The other LIST columns store standard object class configuration information—namely the must and may contain attributes and the inherited superclasses.

6.2 Portability

BLOB Table

This table has been included to hold "Binary Large Objects". The maximum size of a one row entry in the ENTRY table is limited by the length of the RAW field. This means that entries must be fragmented. Fragmented entries will occupy more than one row and so a VFRAG field must be used to denote the fragment of the entry that is being stored in a particular row.

There are two options for storing very large values:
a) Add a "fragment flag" to the ENTRY table and store the entry in fragments over a number of lines; or
b) Add a BLOB table to store the entry and add a "BLOB flag" to the ENTRY table to indicate that this value is stored in the BLOB.

The second option has a number of advantages. Firstly, the inclusion of a BLOB table prevents the ENTRY table from becoming excessively large. Generally most entries will be less than a few hundred characters in length, so the length of the RAW field in the ENTRY table can accordingly be reduced to cater for those entries and the RAW field in the BLOB table can be increased to a value approaching the maximum record size. This will make storage more efficient, i.e. reduce the amount of unused bytes in each column of each table and reduce the number of fragments needed for each entry in the BLOB table. It also means that each value will have only one entry in the ENTRY table and that the ENTRY and SEARCH tables maintain their one-to-one correlation. Secondly the use of a BLOB table enables the application to make use of any database support for Binary Large Objects. (e.g. 64K Binary Columns).

6.3 Functional Extensibility

FLAGS Columns

FLAGS column(s) are preferred to be added. These column(s) have been added to provide extensibility to the design. Specific values can be added to the flags as new functionality is required, without changing the table structure.

Note:

a) In the SEARCH table, the DISTING field may be absorbed into the FLAGS field.

b) In the DIT table, the ALIAS field may be absorbed into the FLAGS field.

The FLAGS column(s) may also provide a "summary" function for each of the tables. This means that the nature of an entry can be determined to some extent by checking the value of the FLAGS field. For example, a flag can be set, in the DIT table, when an entry is a leaf. Checking this flag is much simpler than checking for children of the entry.

The FLAGS column can also be used to store security information, whether an alias points inside its parents subtree, whether a value is a BLOB, etc.

7. Example Implementation

The following provides an example of system performance and capabilities. It is to be understood that the present inventions should not be limited to the following disclosure.

7.1 Overall System Benefits

The present invention is considered to provide enhanced performance over prior art implementations. Performance can be appraised in many ways, including:

aliases;

size (use of relational theory);

complexity (use of query optimiser and search method(s));

extensibility (use of meta-data); and substantially without degrading efficiency (use of disk based model) and reliability (use of RDBMS).

The present invention is considered unique in its ability to claim performance improvement in all areas noted above.

7.2 Test Results

Performance testing of the present invention has been carried out, with the objectives of:

Proving that an SQL based X.500 application can perform at subsecond speeds, dispelling a widely held myth in the marketplace that it is impossible to implement an X.500 DSA application as an integrated RDBMS application and achieve efficiency and performance.

Proving that the design of an SQL based X.500 application can outperform existing memory resident style X.500 designs, especially for databases in excess of 100K entries, a typical limit of current designs.

Providing a structured suite of tests that can demonstrate the above performance on demand for a wide variety of services and database sizes.

Test results reveal the following Table 7A

TABLE 7A

| | Service | | | Database Size (number of entries) | | | | | |
|---|---|---|---|---|---|---|---|---|---|
| Operation | Qualifier | Detail | | 1K | 10K | 20K | 50K | 100K | 200K |
| BIND | anonymous | | | 0.00 | 0.00 | 0.00 | 0.00 | 0.00 | 0.00 |
| LIST | level 1 | 4 items | | 0.05 | 0.05 | 0.05 | 0.05 | 0.05 | 0.05 |
| | level 3 | 4 items | | 0.06 | 0.06 | 0.06 | 0.06 | 0.06 | 0.06 |
| | level 4 | 100 items | | 0.22 | 0.23 | 0.23 | 0.24 | 0.23 | 0.24 |
| READ | level 4 | 1 item, all info | | 0.07 | 0.07 | 0.07 | 0.07 | 0.07 | 0.08 |
| | level 4 (via alias) | 1 item, all info | | 0.07 | 0.07 | 0.07 | 0.07 | 0.07 | 0.07 |
| SEARCH | 1 level, equality | 100 entries, 1 item | | 0.12 | 0.12 | 0.12 | 0.12 | 0.13 | 0.13 |
| | 1 level, initial | 100 entries, 1 item | | 0.13 | 0.14 | 0.15 | 0.15 | 0.15 | 0.14 |
| | 1 level, any | 100 entries, 1 item | | 0.30 | 0.35 | 0.33 | 0.32 | 0.36 | 0.29 |
| | 1 level, final | 100 entries, 1 item | | 0.24 | 0.35 | 0.31 | 0.30 | 0.35 | 0.28 |
| | subtree, equality 1K, | 1 item, level 1 | | 0.11 | 0.11 | 0.11 | 0.11 | 0.11 | 0.11 |
| | 10K, | 1 item, level 1 | | xxx | xxx | 0.12 | 0.12 | 0.12 | 0.12 |
| | 20K, | 1 item, level 1 | | xxx | xxx | xxx | 0.12 | 0.13 | 0.12 |
| | 50K, | 1 item, level 1 | | xxx | xxx | xxx | xxx | 0.13 | 0.13 |
| | 100K, | 1 item, level 1 | | xxx | xxx | xxx | xxx | xxx | 0.12 |
| | subtree, initial 1K, | 1 item, level 1 | | 0.13 | 0.12 | 0.12 | 0.12 | 0.12 | 0.11 |
| | 10K, | 1 item, level 1 | | xxx | xxx | 0.11 | 0.12 | 0.12 | 0.12 |
| | 20K, | 1 item, level 1 | | xxx | xxx | xxx | 0.13 | 0.12 | 0.12 |
| | 50K, | 1 item, level 1 | | xxx | xxx | xxx | xxx | 0.13 | 0.12 |
| | 100K, | 1 item, level 1 | | xxx | xxx | xxx | xxx | xxx | 0.11 |
| | full, complex OR | all entries, 1 item | | 0.09 | 0.09 | 0.09 | 0.09 | 0.09 | 0.09 |
| | full, complex AND | all entries, 1 item | | 0.11 | 0.11 | 0.11 | 0.11 | 0.11 | 0.11 |
| | full, complex OR/AND | all entries, 1 item | | 0.26 | 0.28 | 0.29 | 0.28 | 0.29 | 0.26 |
| | full, complex AND/OR | all entries, 1 item | | 0.12 | 0.12 | 0.13 | 0.14 | 0.13 | 0.12 |
| | full, complex AND/AND | all entries, 1 item | | 0.16 | 0.15 | 0.16 | 0.17 | 0.18 | 0.18 |
| | full, complex AND/AND/AND | all entries, 1 item | | 0.18 | 0.18 | 0.18 | 0.19 | 0.20 | 0.26 |
| | full, equality | all entries, 1 item | | 0.08 | 0.08 | 0.08 | 0.08 | 0.08 | 0.08 |
| | full, no filter, all-info | all entries, 10 item | | 0.30 | 0.74 | 0.43 | 0.59 | 0.49 | 0.67 |
| | full, no filter, all-info | all entries, 100 item | | 1.36 | 1.84 | 1.50 | 1.79 | 1.82 | 1.86 |
| | full, initial | all entries, 1 item | | 0.08 | 0.08 | 0.08 | 0.08 | 0.08 | 0.08 |
| ADD | level 5 | 100 sisters | | 0.22 | 0.19 | 0.22 | 0.20 | 0.19 | 0.19 |
| MODIFY | level 5 | 100 sisters | | 0.09 | 0.11 | 0.11 | 0.11 | 0.11 | 0.11 |

TABLE 7A-continued

| Service | | | Database Size (number of entries) | | | | | |
|---|---|---|---|---|---|---|---|---|
| Operation | Qualifier | Detail | 1K | 10K | 20K | 50K | 100K | 200K |
| RENAME | level 5 | 100 sisters | 0.15 | 0.16 | 0.15 | 0.16 | 0.16 | 0.15 |
| DELETE | level 5 | 100 sisters | 0.17 | 0.16 | 0.17 | 0.17 | 0.17 | 0.19 |
| UNBIND | | | 0.00 | 0.00 | 0.00 | 0.00 | 0.00 | 0.00 |

Notes:
1. All searches and reads return all info
2. All tests were performed under the following environment; Sun SparcStation 5 with 32 Mb of memory (entry level UNIX machine) Ingres 6.4/04 configured for 32 users (standard Ingres installation) DSA prototype V2.1.2
Timings measured at DSA console (ie does not include network overheads)
All numbers are in units of seconds and "K" means 1,000's.

7.3 Test Conclusions

A set of directories was constructed ranging from 1K to 200K entries with varying depth and width of the hierarchy, and a corresponding test plan was produced. The tests were performed a number of times to ensure consistency.

The following conclusions can be drawn from these results;

1. The effects of navigation, in test, were negligible.
2. Reading an object via an alias, in test, showed no appreciable decrease in performance and in some cases reading an object via an alias was in fact faster than reading the object directly. This is due to the reduced navigation required when an alias points "down" to an object that is deeper in the tree structure than the alias entry.
3. Search results were "flat" over different sized subtrees in different sized directories for both exact and initial string searches.
4. Initial and exact full tree searches, in test, were slightly quicker than their respective subtree searches, even though the number of entries searched was greater. This is due to the fact that the full tree searches are able to use more efficient SQL (no table joins are required).
5. All services were, in test, performed in under one second, except for searches returning large amounts of data. However the average time of retrieval per entry drops as the number of entries retrieved increases (e.g for 10 entries retrieval time is approximately 50 milliseconds per entry, for 100 entries this drops to approximately 20 milliseconds per entry).
6. All complex searches, in test, were performed in under one second. However, there may be some obscure searches (e.g containing combinations of NOT) which may not perform as well.

Because this is a disk based system (rather than a memory based system) performance is essentially only dependent on the number of entries actually returned. It is relatively independent of the search complexity, the depth of the hierarchy, the number of attributes per entry or the types of attributes used in the query. In a "live" application of the system it may be possible to improve on the achieved test results by tuning the caching parameters, and by having a greater diversity of attributes.

I claim:

1. Software for use in implementing a directory services system, the software comprising a program of instructions encoded on a computer readable memory and when executed using one or more processors, operable to:
   using one or more processors to arrange attributes of a directory in a database adapted to store a plurality of entries, each entry representing an object and each entry having at least one attribute, each attribute being related to one of a plurality of attribute types and each attribute having an attribute value;
   wherein the database comprises:
      a first column adapted to store the attribute types;
      a second column adapted to store attribute syntaxes, wherein each attribute syntax identifies treatment for an attribute value in an entry associated with the attribute syntax, the treatment based on one or more syntax rules;
      a third column adapted to store the attribute values;
      a fourth column adapted to store one or more distinguished value identifiers corresponding to one or more of the plurality of attributes, wherein each distinguished value identifier indicates whether the corresponding attribute value is used to name a corresponding entry; and
      a fifth column adapted to store aliases, wherein each alias correlates two or more of the plurality of entries, each alias pointing from a first entry to a correlated entry by providing an alternative name for that entry and identifying that the first entry is an alias of the correlated entry.

2. Software for use in implementing a directory services system, the software comprising a program of instructions encoded on a computer readable memory and when executed using one or more processors, operable to:
   using one or more processors to arrange attributes of a directory in a database adapted to store a plurality of entries, each entry representing an object and each entry having at least one attribute, each attribute being related to one of a plurality of attribute types, and each attribute having an attribute value;
   wherein a single table of the database comprises:
      a first column adapted to store the attribute types;
      a second column adapted to store attribute syntaxes, wherein each attribute syntax identifies treatment for an attribute value in an entry associated with the attribute syntax, the treatment based on one or more syntax rules; and
      a third column adapted to store the attribute values.

3. The software of claim 2, wherein:
   each of the attributes is related to a specified entry, each entry representing an object and each entry identified by an object name; and
   the database further comprises a fourth column adapted to store the object names.

4. The software of claim 3, wherein:
   a plurality of the entries are defined in a hierarchical structure and have at least one parent entry, each parent entry representing a parent object and each parent entry identified by a parent name; and the database further comprises a fifth column adapted to store the parent names.

5. The software of claim 3, wherein:

a plurality of the entries are defined in a tree structure such that each entry is one or more of a child, a parent, and a root; and each child has one or more parents.

6. The software of claim 2, wherein the database supports the Structured Query Language (SQL).

7. A computer-implemented method for managing a directory service system, the method comprising:

using one or more processors to attributes of a directory in a database adapted to store a plurality of entries, each entry representing an object and each entry having at least one attribute, each attribute being related to one of a plurality of attribute types, and each attribute having an attribute value;

wherein the database comprises:

a first column adapted to store the attribute types;

a second column adapted to store attribute syntaxes, wherein each attribute syntax identifies treatment for an attribute value in an entry associated with the attribute syntax, the treatment based on one or more syntax rules; and a third column adapted to store the attribute values.

8. The method of claim 7, wherein:

each of the attributes is related to a specified entry, each entry representing an object and each entry identified by an object name; and the database further comprises a fourth column adapted to store the object names.

9. The method of claim 8, wherein:

a plurality of the entries are defined in a hierarchical structure and have at least one parent entry, each parent entry representing a parent object and each parent entry identified by a parent name; and the database further comprises a fifth column adapted to store the parent names.

10. The method of claim 8, wherein:

a plurality of the entries are defined in a tree structure such that each entry is one or more of a child, a parent, and a root; and each child has one or more parents.

11. The method of claim 7, wherein the database supports the Structured Query Language (SQL).

12. Software for use in implementing a directory services system, the software comprising a program of instructions encoded on a computer readable memory and when executed using one or more processors, operable to:

using one or more processors to arrange attributes of a directory in a database adapted to store a plurality of entries; each entry representing an object, each entry having at least one entry identifier, and each entry having at least one attribute; each attribute having at least one attribute identifier;

wherein the database comprises:

a first table adapted to store the entry identifiers and the attribute identifiers; and a second table adapted to store one or more attribute syntaxes for correlated attribute identifiers in the first table, wherein each attribute syntax identifies treatment for an attribute value in an entry associated with the attribute syntax, the treatment based on one or more syntax rules.

13. The software of claim 12, wherein the entry identifiers correlate the plurality of entries with hierarchy information for those entries.

14. The software of claim 12, wherein the database supports the Structured Query Language (SQL).

15. Software for use in implementing a directory services system, the software comprising a program of instructions encoded on a computer readable memory and when executed using one or more processors, operable to:

using one or more processors to arrange attributes of a directory in a database adapted to store a plurality of entries; each entry representing an object, each entry having at least one entry identifier, and each entry having at least one attribute; each attribute having at least one attribute identifier;

wherein the database comprises:

a first table adapted to store the entry identifiers and the attribute identifiers; and a second table adapted to store:

the attribute value as a plurality of attribute value fragments for correlated attribute identifiers in the first table, wherein the attribute value occupies a plurality of rows in the second table, wherein each multiple attribute value fragment is stored in a separate one of the plurality of rows in the second table and combine to define a single attribute value; and a plurality of fragment identifiers to index the plurality of attribute value fragments.

16. The software of claim 15, wherein the attribute value defined by the multiple attribute value fragments is a binary-large-object (BLOB).

17. Software for use in implementing a directory services system, the software comprising a program of instructions encoded on a computer readable memory and when executed using one or more processors, operable to:

using one or more processors to arrange attributes of a directory in a database adapted to store a plurality of entries, each entry representing an object and each entry having at least one attribute, the database comprising a table adapted to store a plurality of entries and a plurality of aliases, wherein each alias correlates two or more entries, and wherein each alias points from a first entry to a correlated entry by providing an alternative name for the first entry and identifies that the first entry is an alias of the correlated entry.

18. Software for use in implementing a directory services system, the software comprising a program of instructions encoded on a computer readable memory and when executed using one or more processors, operable to:

using one or more processors to arrange attributes of a directory in a database adapted to store a plurality of entries, each entry representing an object and each entry having at least one attribute, the database comprising a table adapted to store a plurality of entry identifiers and a plurality of alias identifiers, wherein each entry identifier correlates an associated object with hierarchy information for the associated object, and wherein each alias identifier correlates two or more entry identifiers, each alias identifier pointing from a first entry identifier to a correlated entry identifier by providing an alternative name for the first entry identifier.

19. Software for use in implementing a directory services system, the software comprising a program of instructions encoded on a computer readable memory and when executed using one or more processors, operable to:

using one or more processors to arrange attributes of a directory in a database adapted to store a plurality of entries, each entry having a plurality of attributes, each attribute having an attribute value;

wherein the database comprises a table comprising:

a first column adapted to store the attribute values;

a second column adapted to store one or more distinguished value identifiers corresponding to one or more of the attributes values, wherein each distinguished value identifier indicates whether the corresponding attribute value is used to name the corresponding entry; and a third column adapted to store attribute syntaxes, wherein each attribute syntax identifies treatment for the corresponding attribute value in the corresponding entry associated with the attribute syntax, the treatment based on one or more syntax rules.

20. The software of claim 19, wherein the one or more distinguished value identifiers comprise binary characters.

21. The software of claim 19, wherein the one or more distinguished value identifiers comprise integers.

22. The software of claim 19, wherein at least one of the one or more entries is named by a plurality of attribute values.

* * * * *